(12) United States Patent
Clausen

(10) Patent No.: US 10,004,039 B2
(45) Date of Patent: Jun. 19, 2018

(54) METHOD AND DEVICE FOR DETECTING INTERFERENCE SCENARIO

(71) Applicant: Intel IP Corporation, Santa Clara, CA (US)

(72) Inventor: Axel Clausen, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 411 days.

(21) Appl. No.: 14/546,183

(22) Filed: Nov. 18, 2014

(65) Prior Publication Data

US 2015/0156724 A1    Jun. 4, 2015

(30) Foreign Application Priority Data

Dec. 4, 2013  (DE) .................. 10 2013 113 457

(51) Int. Cl.
| | |
|---|---|
| *H04W 52/02* | (2009.01) |
| *H04W 52/24* | (2009.01) |
| *H04L 25/02* | (2006.01) |
| *H04L 5/00* | (2006.01) |

(52) U.S. Cl.
CPC ... *H04W 52/0238* (2013.01); *H04W 52/0229* (2013.01); *H04W 52/244* (2013.01); *H04L 5/0073* (2013.01); *H04L 25/0208* (2013.01); *Y02D 70/00* (2018.01); *Y02D 70/1222* (2018.01); *Y02D 70/1242* (2018.01); *Y02D 70/1262* (2018.01); *Y02D 70/1264* (2018.01); *Y02D 70/168* (2018.01)

(58) Field of Classification Search
None
See application file for complete search history.

(56) References Cited

U.S. PATENT DOCUMENTS

| | | | |
|---|---|---|---|
| 9,066,367 B2 | 6/2015 | Xu et al. | |
| 9,337,972 B2 | 5/2016 | Jiang | |
| 2011/0312316 A1* | 12/2011 | Baldemair | H04L 5/001 |
| | | | 455/422.1 |
| 2012/0201152 A1 | 8/2012 | Yoo et al. | |
| 2013/0017794 A1 | 1/2013 | Kloper et al. | |
| 2013/0017825 A1 | 1/2013 | Li et al. | |

(Continued)

FOREIGN PATENT DOCUMENTS

| | | |
|---|---|---|
| CN | 101370240 A | 2/2009 |
| CN | 102077637 A | 5/2011 |

(Continued)

*Primary Examiner* — Vinncelas Louis
(74) *Attorney, Agent, or Firm* — Eschweiler & Potashnik, LLC

(57) ABSTRACT

A method for detecting interference scenario may include receiving a composite signal. The composite signal having a plurality of transmissions from a serving cell and from at least one interfering cell, each of the plurality of transmissions which has a first part scaled according to a first power scale, a second part scaled according to a second power scale, and a third part transmitted with a fixed power value. The method further includes determining a first power value based on the third part of a transmission from the serving cell, determining a second power value based on the first part of the plurality of transmissions, and detecting an interference scenario based on the first power value and the second power value.

21 Claims, 14 Drawing Sheets

(56) References Cited

U.S. PATENT DOCUMENTS

| | | | |
|---|---|---|---|
| 2013/0053077 A1* | 2/2013 | Barbieri | H04B 7/0626 455/509 |
| 2013/0114430 A1 | 5/2013 | Koivisto et al. | |
| 2013/0114435 A1 | 5/2013 | Wang et al. | |
| 2013/0114441 A1 | 5/2013 | Yoo et al. | |
| 2013/0260744 A1* | 10/2013 | Xu | H04W 24/02 455/423 |
| 2013/0303153 A1* | 11/2013 | Bontu | H04L 1/0026 455/423 |
| 2013/0315084 A1* | 11/2013 | Krishnamurthy | H04L 5/001 370/252 |
| 2014/0204857 A1* | 7/2014 | Mallik | H04L 1/0009 370/329 |
| 2014/0274079 A1* | 9/2014 | Li | H04W 72/04 455/450 |
| 2016/0112963 A1* | 4/2016 | Koutsimanis | H04J 11/0023 455/452.1 |

FOREIGN PATENT DOCUMENTS

| | | |
|---|---|---|
| GB | 2499222 A | 8/2013 |
| WO | 2012112185 A1 | 8/2012 |
| WO | 2012158959 A1 | 11/2012 |

\* cited by examiner

METHOD AND DEVICE FOR DETECTING INTERFERENCE SCENARIO

CROSS REFERENCE TO RELATED APPLICATION

This application claims priority to German Patent Application number 10 2013 113 457.2, filed Dec. 4, 2013 and is hereby incorporated by reference in its entirety.

FIELD

The disclosure relates to methods and devices for detecting interference scenarios based on a received composite signal comprising transmissions from a plurality of cells, in particular based on a radio signal received in synchronized mobile networks according to a mobile communications standard such as 3GPP Long Term Evolution.

BACKGROUND

Modern cellular networks face the challenge that the demand for data traffic is increasing dramatically. Network operators need to modify their networks to increase the overall capacity. One solution may be to place denser macro cells. However, this solution may be very costly and rapidly moving users might be required to perform handovers very frequently. Another solution may be heterogeneous networks. One macro cell may be used for coverage of a larger area and small (e.g. pico or femto) cells may be placed into the coverage area to increase the capacity at some "hot spots". The deployment of small cells may be less expensive compared to new macro cells, may increase the coverage, and may increase the overall data throughput of the network. However, it may generate as well strong interference scenarios. It may thus be desirable to provide a method and a device to detect the interference scenarios in order to take countermeasures.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
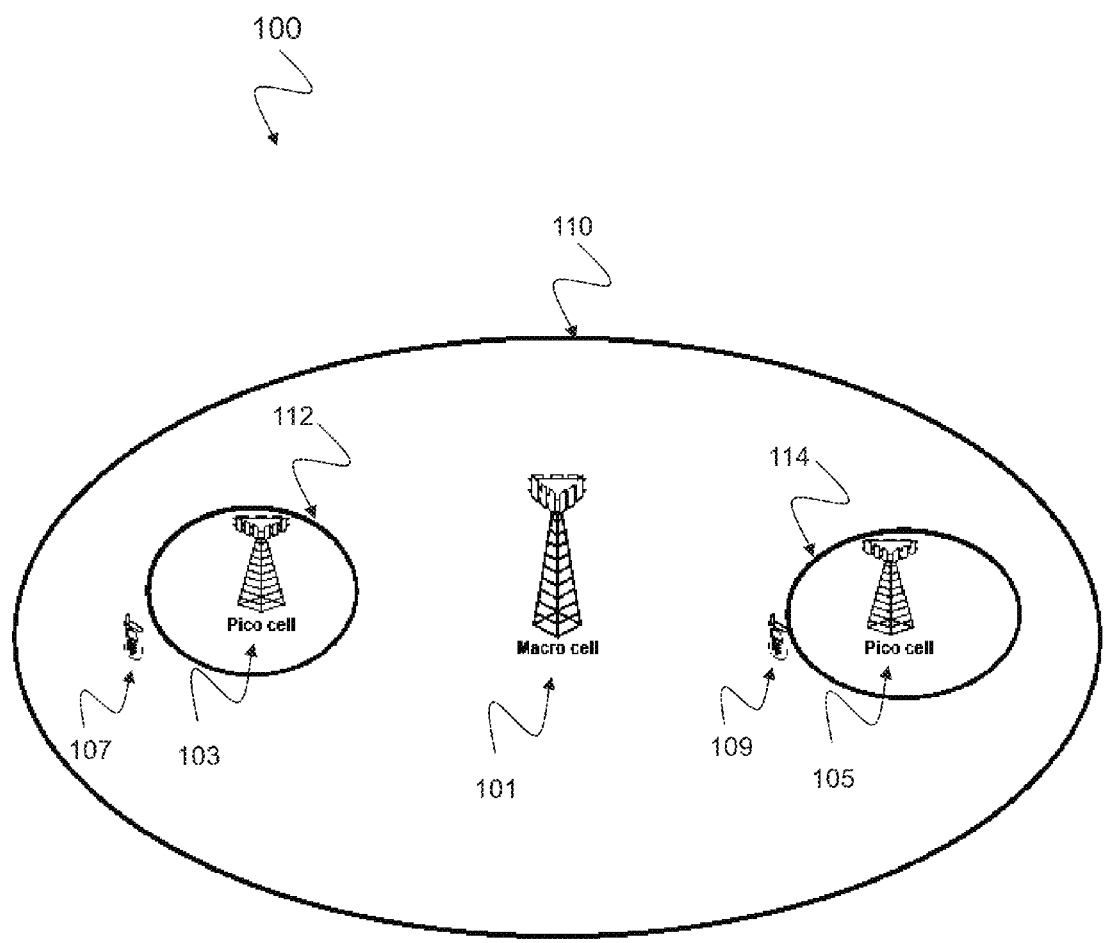
FIG. 1 is a schematic diagram of a heterogeneous network 100 including a macro cell 101 and pico cells 103, 105 according to an interference scenario.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The following terms, abbreviations and notations will be used herein:
CRS: cell specific reference signal,
RE: resource element,
IRC: interference rejection combining,
MMSE: minimum mean square error,
LTE: Long Term Evolution,
LTE-A: LTE Advanced, Release 10 and higher versions of i. 3GPP LTE,
RF: Radio Frequency,
UE: User Equipment,
INR: interference to noise ratio,
RBSF: resource block subframe, i.e., a resource block in frequency direction times subframe in time direction.

The methods and devices described herein may be based on interference scenario detection, power scaling and colliding and non-colliding aggressor cells. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE and/or OFDM. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard. LTE (Long Term Evolution), marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements. The standard is developed by the 3GPP (3rd Generation Partnership Project) and is specified in its Release 8 document series, with enhancements described in Releases 9, 10 and 11.

The methods and devices described hereinafter may be applied in OFDM systems. In the following, Orthogonal frequency-division multiplexing (OFDM) systems are described. OFDM is a scheme for encoding digital data on multiple carrier frequencies. OFDM has developed into a popular scheme for wideband digital communication, whether wireless or over copper wires, used in applications such as digital television and audio broadcasting, DSL broadband internet access, wireless networks, and 4G mobile communications. OFDM is a frequency-division multiplexing (FDM) scheme used as a digital multi-carrier modulation method. A large number of closely spaced orthogonal sub-carrier signals may be used to carry data. The orthogonality may prevent crosstalk between sub-carriers. The data may be divided into several parallel data streams or channels, one for each sub-carrier. Each sub-carrier may be modulated with a conventional modulation scheme (such as quadrature amplitude modulation or phase-shift keying) at a low symbol rate, maintaining total data rates similar to conventional single-carrier modulation schemes in the same bandwidth. OFDM may be essentially identical to coded OFDM (COFDM) and discrete multi-tone modulation (DMT).

The methods and devices described hereinafter may be applied in multi-layer heterogeneous networks. In the following, multi-layer heterogeneous networks, macro cells, pico cells, femto cells, target cells, and interfering cells are described. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes. These eNodeBs may commonly be referred to as macro eNodeBs (MeNB) or macro cells, pico eNodeBs (PeNB) or pico cells and femto/home eNodeBs (HeNB) or femto cells and meant for basic outdoor, outdoor hot-zone and indoor/enterprise coverage, respectively. Alternatively, the term "small cells" might be used as a broader term covering pico and femto cells.

Macro cells may cover a large cell area (typical cell radius being of the order of 500 meters to a kilometer), with transmit antennas above the clutter and transmission power of the order of 46 dBm (20 watts). They may provide service to all users. Femto cells, also called Home eNodeBs (HeNBs) may be lower power cells installed (typically indoors) by an end-consumer. Pico cells may be operator deployed cells, with lower transmission powers—typically an order of magnitude smaller—relative to macro cell eNodeBs. They may be installed typically in wireless hotspot areas (for example, malls) and provide access to all users. In a scenario where a UE is connecting to pico cells, the pico cell may represent the target cell while the macro cell may represent the interfering cell providing strong interference.

The methods and devices described hereinafter may be applied in eICIC systems. In the following, enhanced inter-cell interference coordination (eICIC) and almost blank sub-frames (ABS) are described. Enhanced intercell interference coordination is used in Release 10 3GPP to avoid heavy inter-cell interference on both data and control channels of the downlink. eICIC may be based on carrier aggregation with cross-carrier scheduling or based on time-domain multiplexing (TDM) using so called almost blank sub-frames (ABS).

eICIC based on Carrier Aggregation may enable an LTE-A UE to connect to several carriers simultaneously. It not only may allow resource allocation across carriers, it also may allow scheduler based fast switching between carriers without time consuming handover. A simple principle in a HetNet scenario may be to partition the available spectrum into e.g. two separate component carriers and assign the primary component carriers (PCC) to different network layers. The primary component carrier may be the cell that provides the control information to the UEs. Each network layer can additionally schedule UEs on other CCs called secondary component carriers (SCC).

eICIC based on Time Domain Multiplexing may periodically mute transmissions from eNodeBs inflicting severe interference onto others for entire sub-frames, so that the victim eNodeBs may have a chance to serve their UEs suffering from severe interference from the aggressor eNodeB in these sub-frames. This muting is not necessarily complete, as certain signals such as Common reference symbols (unless configured as MBSFN sub-frame), Primary and secondary synchronization signals (PSS and SSS), Physical broadcast channel (PBCH), SIB-1 and paging with their associated PDCCH may have to be transmitted even in otherwise muted sub-frames e.g. to avoid radio link failure or for reasons of backwards compatibility. Collisions of sub-frame muting with PSS, SSS, SIB-1 and paging should be minimized. Hence, muting in sub-frames #0, #1, #5 and #9 should be avoided as far as possible. Sub-frames thus muted may be referred to as almost blank sub-frames (ABS).

The methods and devices described hereinafter may be applied in interference aware receivers such as IRC (Interference Rejection Combining) receivers. IRC is a technique that may be used in an antenna diversity system to suppress co-channel interference by using the cross covariance between the noise in diversity channels. Interference rejection combining (IRC) may be used as an efficient alternative to increase uplink bit rates in areas where cells overlap. The interference rejection combining (IRC) receiver may be effective in improving the cell-edge user throughput because it may suppress inter-cell interference. The IRC receiver may be typically based on a minimum mean square error (MMSE) criteria, which may require channel estimation and covariance matrix estimation including the inter-cell interference with high accuracy.

The methods and devices described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which is described by the channel matrices between respective antennas of the transmitter and respective antennas of the receiver.

This disclosure presents an algorithm for interference scenario detection in synchronized mobile networks such as LTE networks. LTE networks may use a frequency reuse factor of one—neighboring cells may use the same frequency band as the serving cell and a mobile device at the cell edge may face strong interference from multiple cells. In particular heterogenous network deployments may increase this issue as multiple pico cells may be placed inside the coverage area of a macro cell. Multiple interference mitigation algorithms for synchronized networks may require knowledge of the scheduling of these interfering cells. Depending on the detection, algorithms may be modified or parameters may be adjusted. In the following, an algorithm is presented which may detect if an aggressor cell is transmitting a resource block or is not transmitting a resource block and scenarios with multiple active aggressor cells.

FIG. 1 is a schematic diagram of a heterogeneous network 100 including a macro cell 101 and pico cells 103, 105. The pico base stations 103, 105 may be characterized by substantially lower transmit power as compared to the macro base station 101. Due to the large disparity between the transmit power levels among two type of base stations, the coverage 112, 114 of the pico base station 103, 105 is significantly limited than the coverage 110 of the macro base station 101 as shown in FIG. 1. The larger coverage 110 of the macro cells 101 may attract more users 107, 109 towards high power macro eNodeB although there might not be enough resources to efficiently serve all user terminals. At the same time, the resources of smaller power base station may remain underutilized. The UEs 107, 109 may include interference scenario detection as described in the following.

Figure 2:
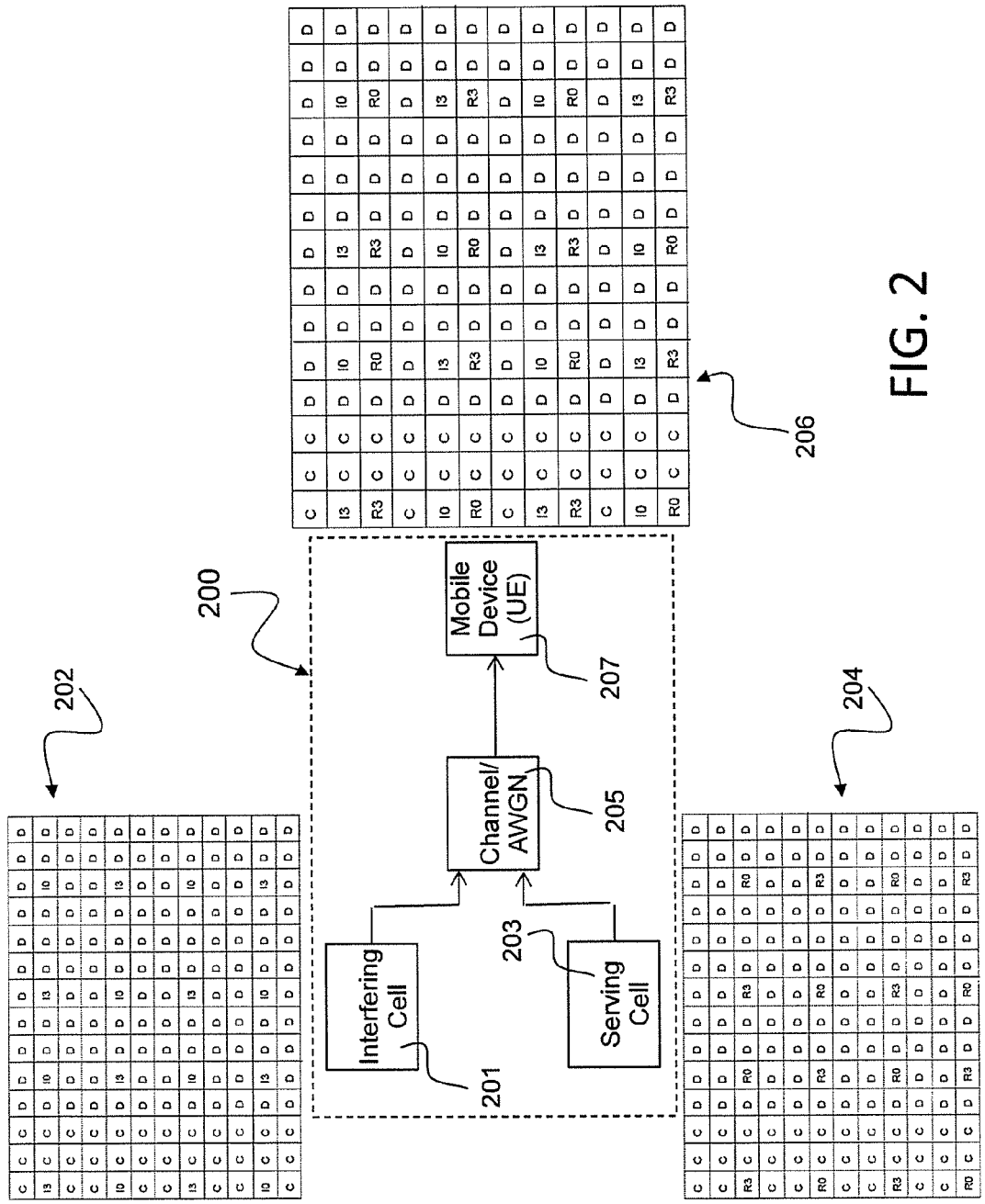
FIG. 2 is a schematic diagram of a non-colliding scenario for a received RBSF (resource block in frequency direction times subframe in time direction) 206 in a communication system 200 including a mobile device 207 receiving a serving signal 204 of a serving cell 203. The serving signal 204 is interfered by an interfering signal 202 of an interfering cell 201 when transmitted over a communication channel 205.

FIG. 2 is a schematic diagram of a non-colliding scenario for a received RBSF (resource block in frequency direction times subframe in time direction) 206 in a communication system 200 including a mobile device 207 receiving a serving signal 204 of a serving cell 203. The serving signal 204 is interfered by an interfering signal 202 of an interfering cell 201 when transmitted over a communication channel 205. An RBSF may be defined as a block having a length of one resource block (e.g. 180 kHz) in the frequency direction and a length of one subframe (e.g. 1 ms) in the time direction.

The serving signal 204 of the serving cell 203 may be represented as a two-dimensional signal pattern in time-frequency domain, e.g. according to an LTE frame structure. The signal pattern may be structured as a two-dimensional grid carrying multiple resource elements which may be designated as small squares forming the grid. The resource elements may be partitioned in a control region comprising control resource elements C in the left section of the grid and in a data region comprising data resource elements D in the right section of the grid. Reference resource elements R0, R3 which are referred to as cell-specific reference signals in LTE may be distributed over the grid in a regular fashion.

In a similar manner, the interfering signal 202 of the interfering cell 201 may also be represented as a two-dimensional signal pattern in time-frequency domain, e.g. according to an LTE frame structure, structured as a two-dimensional grid carrying multiple resource elements forming the grid. Reference resource elements I0, I3 which are referred to as cell-specific reference signals in LTE may be arranged in a regular pattern over the grid similar to the serving signal 204. This regular pattern may be a predetermined one which is used for characterizing the interfering cell 201. However, the regular pattern of the interfering signal 202 may be different from the regular pattern of the serving signal 204 as can be seen from FIG. 2. When the cell-specific reference signals of both the serving signal 204 denoted hereinafter as R0 and R3 and the interfering signal 202 denoted hereinafter as I0 and I3 do not coincide, the interference scenario is referred to as "non-colliding". When the cell-specific reference signals R0, R3 and I0, I3 of both the serving signal 204 and the interfering signal 202 coincide, the interference scenario is referred to as "colliding". The non-colliding interference scenario is depicted in FIG. 2 while the colliding interference scenario is depicted in FIG. 3.

Both, serving signal 204 of the serving cell 203 and interfering signal 202 of the interfering cell 201 may be transmitted over a communication channel 205. In the communication channel 205 both signals 204, 202 may be superimposed thereby forming a common signal as receive signal 206 which may be received by the mobile device 207.

The receive signal 206 received by the mobile device 207 may also be represented as a two-dimensional signal pattern in time-frequency domain, e.g. according to an LTE frame structure, structured as a two-dimensional grid carrying multiple resource elements forming the grid. A mobile device 207 comprising interference scenario detection as described in the following may be able to detect such non-colliding scenarios.

Figure 3:
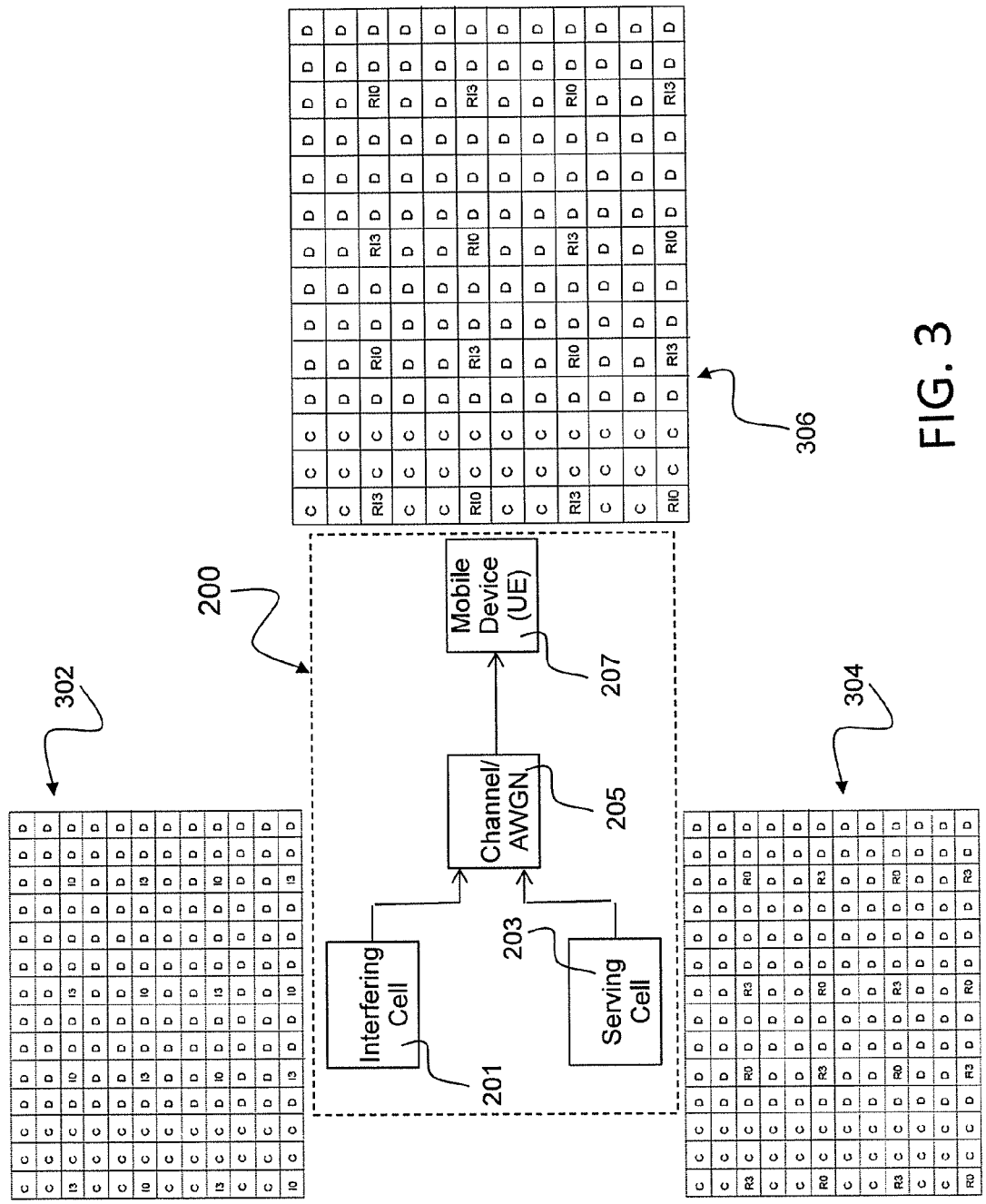
FIG. 3 is a schematic diagram of a colliding scenario for a received RBSF 306 in the communication system 200 depicted in FIG. 2. The serving signal 304 is interfered by an interfering signal 302 when transmitted over the communication channel 205.

FIG. 3 is a schematic diagram of a colliding scenario for a received RBSF 306 in the communication system 200 depicted in FIG. 2. The serving signal 304 is interfered by an interfering signal 302 when transmitted over the communication channel 205.

The serving signal 304 of the serving cell 203 may be represented as a two-dimensional signal pattern in time-frequency domain as described above with respect to FIG. 2. Reference resource elements R0, R3 which are referred to as cell-specific reference signals in LTE may be arranged in a regular pattern over the grid.

In a similar manner, the interfering signal 302 of the interfering cell 201 may also be represented as a two-dimensional signal pattern in time-frequency domain as described above with respect to FIG. 2. Reference resource elements I0, I3 which are referred to as cell-specific reference signals in LTE may be arranged in a regular pattern over the grid. FIG. 3 illustrates the colliding scenario where the cell-specific reference signals I0, I3 of the interfering signal 302 collide with the cell-specific reference signals R0, R3 of the serving signal 304. In the received RBSF 306 the cell-specific reference signals R0, R3 and I0, I3 from serving cell 203 and interfering cell 201 collide in single resource elements denoted hereinafter as RI0 and RI3. A mobile device 207 comprising interference scenario detection as described in the following may be able to detect such colliding scenarios.

Figure 4:
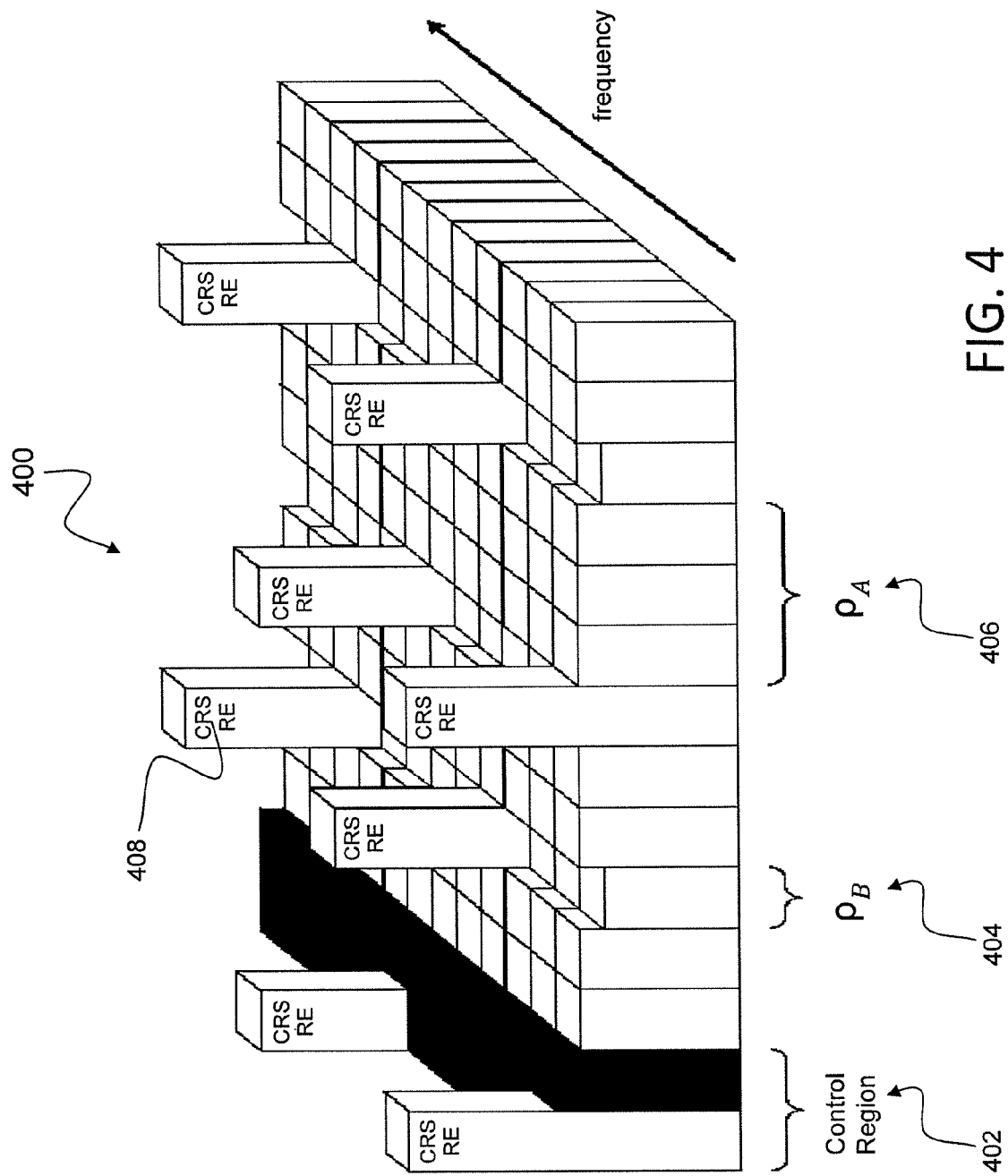
FIG. 4 is a schematic 3D time-frequency representation of an LTE radio frame 400 including first resource elements 406 scaled with a first scaling factor $\rho_A$ (rhoA), second resource elements 404 scaled with a second scaling factor $\rho_B$ (rhoB) and cell-specific reference signals (CRS) 408

FIG. 4 is a schematic 3D time-frequency representation of an LTE radio frame 400 including first resource elements 406 scaled with a first scaling factor $\rho_A$, second resource elements 404 scaled with a second scaling factor $\rho_B$ and cell-specific reference signals 408.

The LTE radio frame 400 is a 3-dimensional representation of the RBSF 206 as depicted in FIG. 2 and the RBSF 306 as depicted in FIG. 3. The LTE radio frame 400 may comprise a control region 402 in the left part and a data region in the right part. A first part 406 of the resource elements may be scaled with a first scaling factor $\rho_A$ and a second part 404 of the resource elements may be scaled with a second scaling factor $\rho_B$. Cell-specific reference signals 408 may be arranged in a regular pattern over the RBSF 400. The cell-specific reference signal 408 may be scaled with a scaling that is different from the first scaling factor $\rho_A$ and the second scaling factor $\rho_B$.

Figure 5:
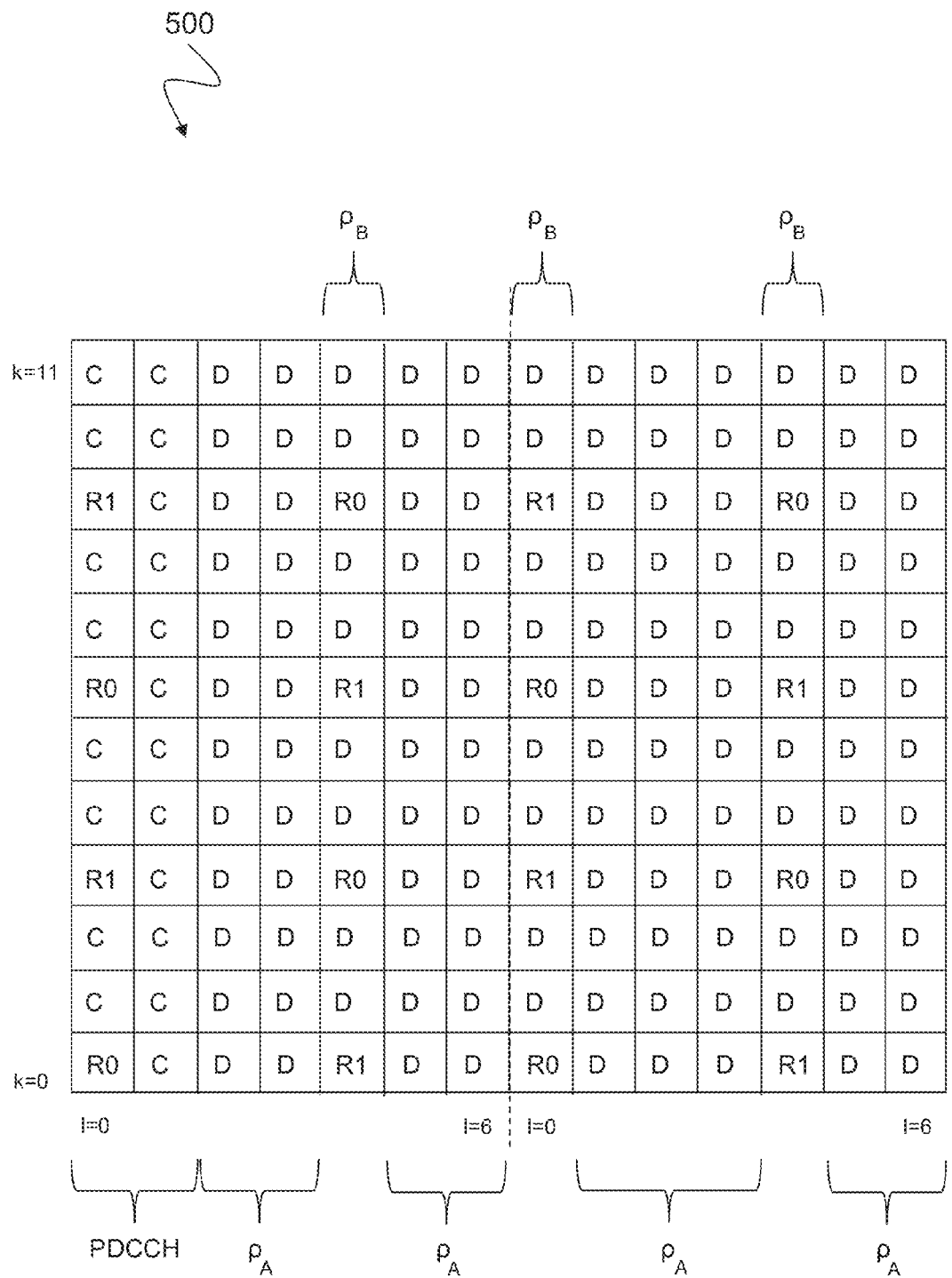
FIG. 5 is a schematic time-frequency representation of a received composite signal including an RBSF 500 according to a one or two cell-specific antenna ports configuration.

FIG. 5 is a schematic time-frequency representation of a received composite signal including an RBSF 500 according to a one or two cell-specific antenna ports configuration. The RBSF 500 may correspond to the RBSF 400 as described above with respect to FIG. 4. Reference signal R0 may represent the first antenna port and reference signal R1 may represent the second antenna port. The control region PDCCH may extend over 2 resource elements in time domain. A first part of the resource elements may be scaled with a first scaling factor $\rho_A$ and a second part of the resource elements may be scaled with a second scaling factor $\rho_B$.

Figure 6:
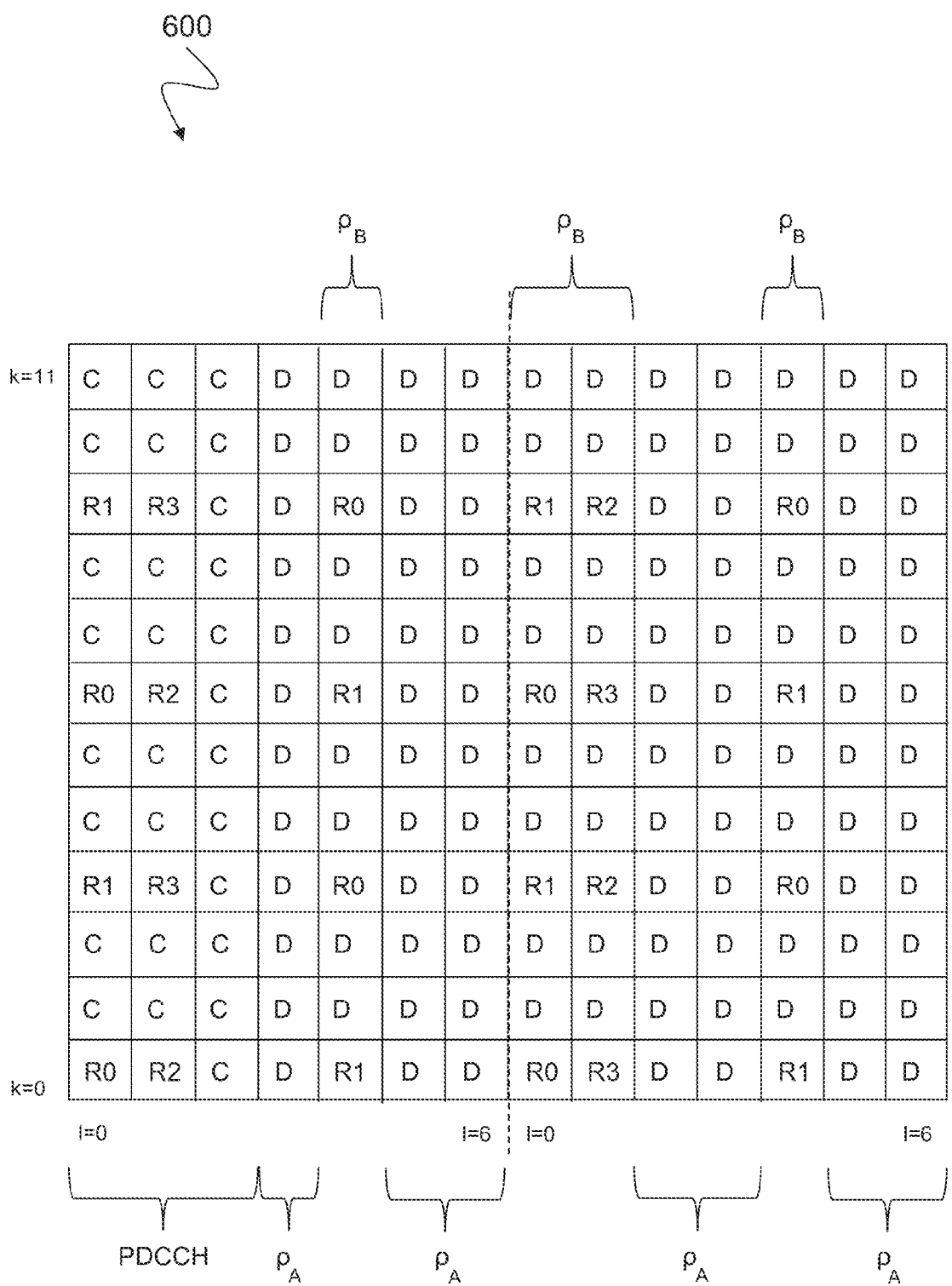
FIG. 6 is a schematic time-frequency representation of a received composite signal including an RBSF 600 according to a four cell-specific antenna ports configuration.

FIG. 6 is a schematic time-frequency representation of a received composite signal including an RBSF 600 according to a four cell-specific antenna ports configuration. The RBSF 600 may be similar to the RBSF 500 as described above with respect to FIG. 5. In contrast to the 1 or 2 antenna port configuration described with respect to FIG. 5, the 3 or 4 antenna port configuration depicted in FIG. 6 comprises four cell specific reference signals R0, R1, R2, R3. The control region PDCCH may extend over 3 resource elements in time domain. Reference signal R0 may represent the first antenna port, reference signal R1 may represent the second antenna port, reference signal R2 may represent the third antenna port and reference signal R3 may represent the fourth antenna port. A first part of the resource elements may be scaled with a first scaling factor $\rho_A$ and a second part of the resource elements may be scaled with a second scaling factor $\rho_B$.

The RBSF 600 may be configured according to the parameter set illustrated in Table 1.

TABLE 1

An exemplary parameter configuration of a received RBSF 600 according to 3GPP standards TS 36.331 V11.5.0 (2013-09) and TS 36.213 V11.4.0 (2013-09)

| Parameter | 3GPP Standard | Comment | One CRS Antenna Port | Two/four CRS Antenna Ports |
|---|---|---|---|---|
| reference signal power | 36.331/6.3.2 | Reference Signal Emitted Power per Resource Element (EPRE) | −60 . . . 50 dBm | |

TABLE 1-continued

An exemplary parameter configuration of a received RBSF 600 according to 3GPP standards TS 36.331 V11.5.0 (2013-09) and TS 36.213 V11.4.0 (2013-09)

| Parameter | 3GPP Standard | Comment | One CRS Antenna Port | Two/four CRS Antenna Ports |
|---|---|---|---|---|
| $P_A$ | 36.331/6.3.2 (PDSCH-Config) | UE specific parameter | −6 dB, −4.77 dB, −3 dB, −1.77 dB, 0 dB, 1 dB, 2 dB, 3 dB | |
| $P_B$ | 36.331/6.3.2 (PDSCH-Config) | cell specific parameter | 0, 1, 2, 3 | |
| $\delta_{power\text{-}offset}$ | 36.213/5.2 | | $\delta_{power\text{-}offset} = 0$ for all PDSCH transmission schemes except Multi-user MIMO | |
| $\rho_A$ | 36.213/5.2 | Derived Parameter | $\rho_A = \delta_{power\text{-}offset} + P_A + 10\log_{10}(2)$ (transmit diversity with 4 cell-specific antenna ports) or $\rho_A = \delta_{power\text{-}offset} + P_A$ | |
| $\rho_B/\rho_A$ | 36.213/5.2 | Derived Parameter (Table 5.2.1 in 36.213) | | |

Figure 7:
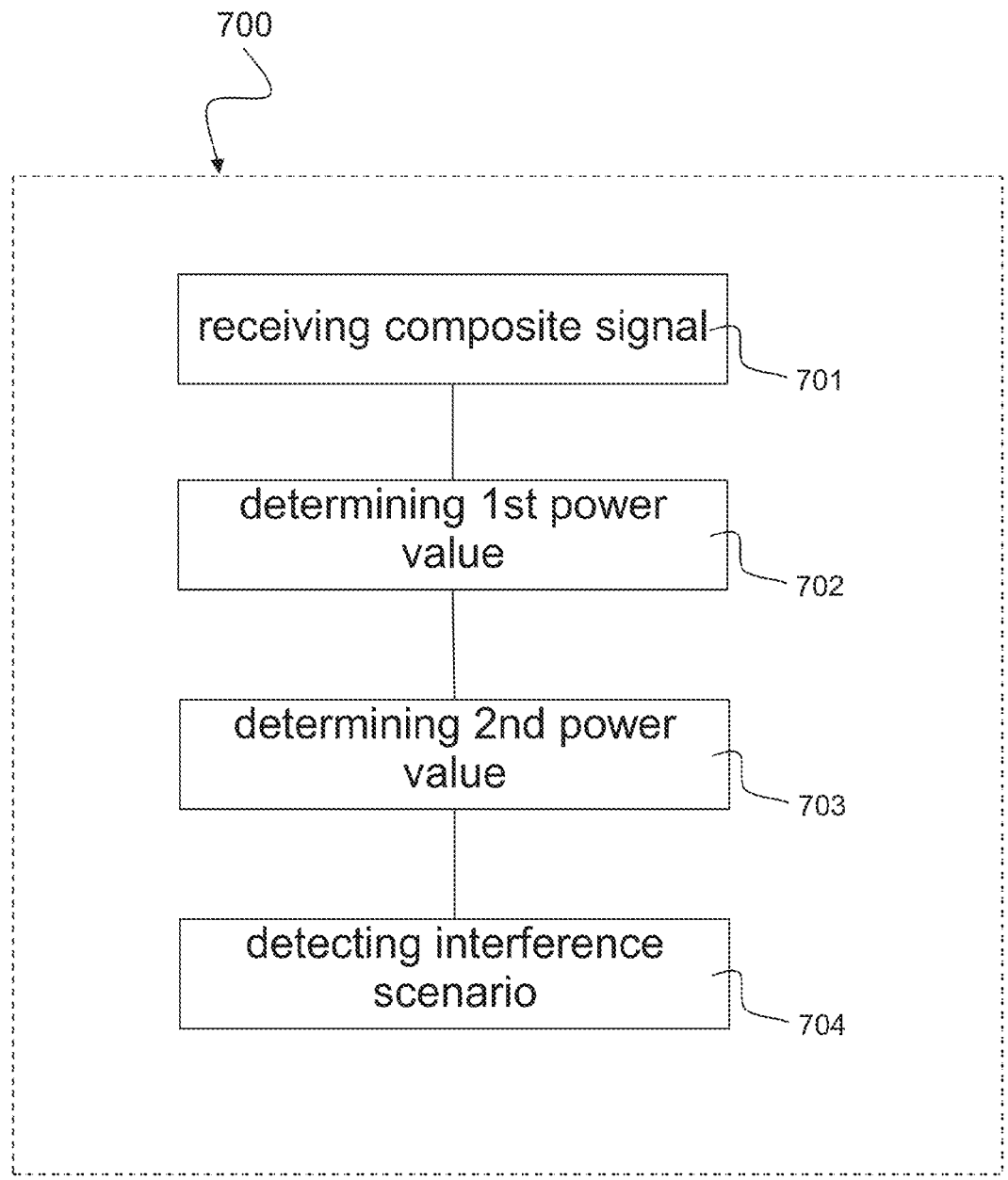
FIG. 7 is a schematic diagram illustrating a method 700 for interference scenario detection.

FIG. 7 is a schematic diagram illustrating a method 700 for interference scenario detection. The method 700 may include receiving 701 a composite signal comprising a transmission from a serving cell and transmissions from at least one interfering cell, each transmission comprising a first part scaled according to a first power scale $\rho_A$, a second part scaled according to a second power scale $\rho_B$ and a third part transmitted with a fixed power value. The method 700 may include determining 702 a first power value $P_{noise,RB}$ based on the third part of the transmission from the serving cell. The method 700 may include determining 703 a second power value $P_{rhoA,RB}$ based on the first parts of the transmissions. The method 700 may include detecting 704 an interference scenario based on the first power value $P_{noise,RB}$ and the second power value $P_{rhoA,RB}$.

In one example, the determining the first power value $P_{noise,RB}$ may include suppressing a portion due to the transmission from the serving cell in the received composite signal. In one example, the suppressing a portion due to the transmission from the serving cell in the received composite signal may include determining the portion due to the transmission from the serving cell by a channel estimate $\hat{H}_0$ and a reference signal $s_0^{CRS}$ from the serving cell. In one example, the determining the second power value $P_{rhoA,RB}$ may include suppressing a portion due to the transmission from the serving cell in the second power value $P_{rhoA,RB}$. In one example, the suppressing a portion due to the transmission from the serving cell in the second power value $P_{rhoA,RB}$ may include determining the portion due to the transmission from the serving cell based on an averaged channel estimate $|\hat{H}_0|^2$ weighted with the first power scale rhoA. In one example, each transmission may include a plurality of resource elements arranged on a two-dimensional time-frequency grid. In one example, a predetermined number of the resource elements in frequency and a predetermined number of the resource elements in time may form a resource block. In one example, the first power value $P_{noise,RB}$ and the second power value $P_{rhoA,RB}$ may be determined on a resource block basis. In one example, the resource block may include a control region and a data region. In one example, the first parts, the second parts and the third parts of the transmissions may be based on resource elements of the data region.

In one example, each of the first parts and the second parts of the transmissions may include rows of resource elements arranged in the resource block with respect to frequency. In one example, the third parts of the transmissions may include resource elements including cell-specific reference symbols arranged at predetermined frequency-time positions in a resource block. In one example, the resource elements may include cell-specific reference symbols transmitted with a known reference power value. In one example, the transmissions from at least one interfering cell may include transmissions from colliding interfering cells which cell specific reference symbols collide with cell specific reference symbols of the serving cell and/or transmissions from non-colliding interfering cells which cell specific reference symbols do not collide with cell specific reference symbols of the serving cell. In one example, the determining the first power value $P_{noise,RB}$ may include averaging a power of the received composite signal over resource elements of a resource block which resource elements comprise cell-specific reference symbols. In one example, the determining the second power value $P_{rhoA,RB}$ may include averaging a power of the received composite signal over resource elements of a resource block which resource elements are scaled according to the first power scale rhoA. In one example, the detecting the interference scenario may be based on two-dimensional thresholds with respect to the first power value ($P_{noise,RB}$) and the second power value $P_{rhoA,RB}$.

In the following, an algorithm is described as one exemplary implementation of the method 700. The algorithm may be implemented on a mobile terminal such as a user equipment 107, 109 as described above with respect to FIG. 1 or on a mobile device or user equipment 207 as described above with respect to FIG. 2. The algorithm may be used for interference scenario detection in synchronized mobile networks such as LTE networks. The interference scenario detection algorithm may compute power estimates on different sets of resource elements and may compare the values to different detection thresholds in a two dimensional plane. The detection thresholds may be determined by computation of expected power estimates, determination of the nearest neighboring expected power estimates for every value, computation of average expected power estimates, and placement of straight lines through these points.

$t^{\rho_A}$ may be referred to as the set of resource elements which are scaled with $\rho_A$ on all cells. For normal cyclic prefix, all resource elements (RE) of symbols with index 3, 5, 6, 9, 10, 12, 13 of each subframe can be used. These are subframe indices for resource elements which are scaled with $\rho_A$ in both antenna configuration RBSF signals 500, 600 as depicted in FIG. 5 and FIG. 6.

$t^{CRS}$ may be referred to as the resource elements of the serving cell cell-specific reference signal (CRS) positions. The signal model may assume a combination of colliding and non-colliding aggressors. For the set $t^{\rho_A}$ the received signal may be given as $$y(t^{\rho_A}) = H_0(t^{\rho_A}) \cdot W_{tx,0}(t^{\rho_A}) \cdot \sqrt{\rho_{A,0}} \cdot s_0(t^{\rho_A}) + \quad (1)$$
$$\sum_{m \in I_{coll}} H_m(t^{\rho_A}) \cdot W_{tx,m}(t^{\rho_A}) \cdot \sqrt{\rho_{A,m}} \cdot s_m(t^{\rho_A}) +$$
$$\sum_{n \in I_{non-coll}} H_n(t^{\rho_A}) \cdot W_{tx,n}(t^{\rho_A}) \cdot \sqrt{\rho_{A,n}} \cdot s_n(t^{\rho_A}) + n(t^{\rho_A})$$

where $H_k$ denotes the channel, $w_{tx,k}$ the precoding matrix, $\rho_{A,k}$ the power scaling value rhoA, $s_k$ the transmitted signal, and k=0 denotes the serving cell, indices m denote colliding aggressors and indices n denote non-colliding aggressors. The additive white Gaussian noise is denoted as n. $I_{non-coll}$ and $I_{coll}$ are sets of non-colliding aggressors and colliding aggressors, respectively.

The signal model for the set of serving cell CRS RE may be given as $$y(t^{CRS}) = H_0(t^{CRS}) \cdot s_0^{CRS}(t^{CRS}) + \sum_{m \in I_{coll}} H_m(t^{CRS}) \cdot s_m^{CRS}(t^{CRS}) + \quad (2)$$
$$\sum_{n \in I_{non-coll}} H_n(t^{CRS}) \cdot W_{tx,n}(t^{CRS}) \cdot \sqrt{\rho_{S,n}} \cdot s_n(t^{CRS}) + n(t^{CRS})$$

and $\breve{y}(t^{CRS})$ may denote the received signal at serving cell CRS RE after subtraction of the remodulated serving cell signal, $$i. \quad \breve{y}(t^{CRS}) = y(t^{CRS}) - \hat{H}_0(t^{CRS}) \cdot s_0^{CRS}(t^{CRS}) \quad (3)$$

where $\hat{H}_k$ denotes the channel estimate of $H_k$.

The basis for a power detector may be two power estimates: first, the noise and interference power on the serving cell CRS positions may be estimated per resource block as $$P_{noise,RB} = \frac{1}{N_{CRS,RB}} \sum_{t \in t^{CRS,RB}} |\breve{y}(t)|^2 \quad (4)$$

and secondly, the received signal power per resource block may be estimated on the resource elements scaled with $\rho_A$ as $$P_{\rho_A,RB} = \frac{1}{N_{\rho_A,RB}} \sum_{t \in t^{\rho_A,RB}} |y(t)|^2 - \rho_{A,0} \cdot |\overline{H}_0|^2 \quad (5)$$

where $\overline{H}_0$ the averaged channel estimate over a resource block and $N_{\rho_A,RB}$, $N_{CRS,RB}$ denote the number of elements of set $t^{\rho_A,RB}$ and $t^{CRS,RB}$, respectively. If more than one receive antenna is present, then the average of the received power values of all receive antennas may be taken.

In one example, determining 702 the first power value $P_{noise,RB}$ of the method 700 may be accomplished by equation (4). In one example, determining 703 the second power value $P_{rhoA,RB}$ of the method 700 may be accomplished by equation (5). Detecting 704 an interference scenario of the method 700 may be accomplished by comparing the first power value $P_{noise,RB}$ of equation (4) against the second power value $P_{rhoA,RB}$ of equation (5).

Figure 8:
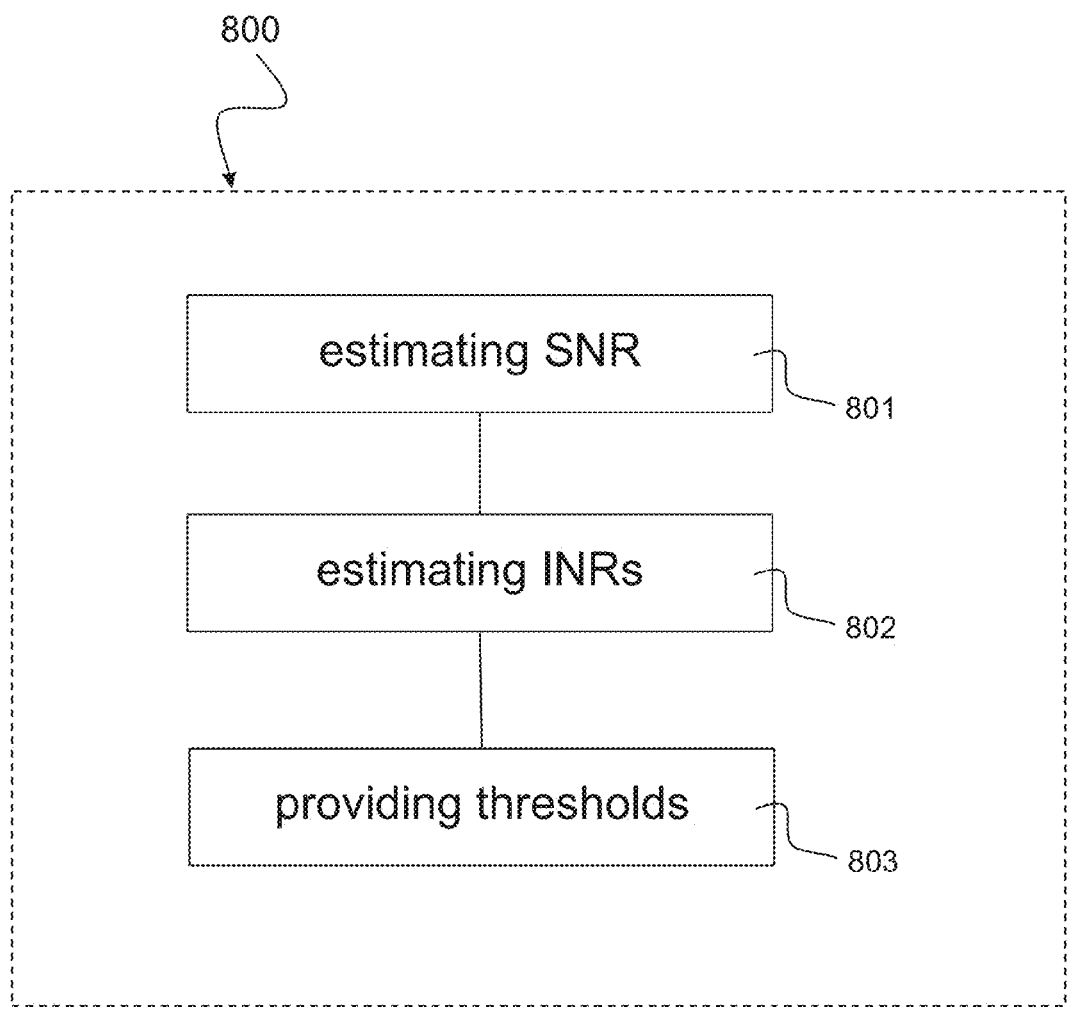
FIG. 8 is a schematic diagram illustrating a method 800 for providing thresholds for interference detection.

FIG. 8 is a schematic diagram illustrating a method 800 for providing a plurality of thresholds for interference detection based on a composite signal comprising a transmission from a serving cell and transmissions from a plurality of interfering cells. The method 800 may include estimating 801 a signal-to-noise ratio (SNR) of the serving cell at a receiver. The method 800 may include estimating 802 for each of the plurality of interference cells an interference-to-noise ratio $INR_n$, $INR_m$ at the receiver. The method 800 may include providing 803 the plurality of thresholds based on the signal-to-noise ratio SNR of the serving cell, the interference-to-noise ratios $INR_n$, $INR_m$ of the interfering cells and information $S_k(s)$ indicating an activity state of the plurality of interfering cells.

In one example, the transmissions from the plurality of interfering cells may comprise transmissions from interference cells colliding with a reference signal of the serving cell and transmissions from interference cells not colliding with the reference signal of the serving cell. In one example, the transmissions of the composite signal may comprise a first part scaled with a first power scaling value rhoA and a second part scaled with a second power scaling value rhoB. The plurality of thresholds may be provided based on the first power scaling values rhoA and the second power scaling values rhoB. In one example, the method 800 may include providing a first power value $P'_{noise,RB}$ based on adding expected receive powers due to the first part of the composite signal according to the information $S_k(s)$ indicating an activity state of the plurality of interfering cells. In one example, the method 800 may include providing a second power value $P'_{rhoA,RB}$ based on adding expected receive powers due to the second part of the composite signal according to the information $S_k(s)$ indicating an activity state of the plurality of interfering cells. In one example, the method 800 may include providing the plurality of thresholds based on the first power value $P'_{noise,RB}$ and the second power value $P'_{rhoA,RB}$.

In the following, an algorithm is described as one exemplary implementation of the method 800. The algorithm may be used for threshold setting with respect to interference scenario detection in synchronized mobile networks such as LTE networks. The algorithm may be implemented on a mobile terminal such as a user equipment 107, 109 as described above with respect to FIG. 1 or on a mobile device or user equipment 207 as described above with respect to FIG. 2.

The detector as described above with respect to FIG. 7 may compare the estimates against thresholds which may happen in a two-dimensional plane. The thresholds may be computed by determining the expected receive power for every scenario combination. For each expected power values, the nearest neighbor expected power values may be determined and the average of these two values may be computed. Straight lines may be placed through the average power values. A computation of the expected receive power may be based on the following inputs. For the serving cell on the parameters rhoA, number of CRS antenna ports and SNR estimate; for the interfering cells on the number of interfering cells, the number of CRS antenna ports, the interference-to-noise Ratio (INR) and the values for rho A and rho B for non-colliding aggressors. Most values may be slowly changing such as for example the SNR, the number of interfering cells, the INR and the active antenna ports and may be obtained from different sources, for example higher layer signaling, cell search module and/or estimates from previous subframes. Alternatively, thresholds can be determined by analysis of received power values $P_{rhoA,RB}$ and $P_{noise,RB}$ from previous subframes, clustering them into groups, and setting thresholds between the clusters by for example taking the mean of each cluster, and computing the threshold by taking the mean between two mean values.

The expected receive power for a scenario s may be computed as $$P'_{pA,RB}(s) = \qquad (6)$$
$$\rho_{A,0} \cdot N_{tx,0} + \sum_{m \in I_{coll}} \left\{\frac{\rho_{A,m}}{SIR_m}\right\} \cdot S_m(s) + \sum_{n \in I_{non-coll}} \left\{\frac{\rho_{A,n}}{SIR_n}\right\} \cdot S_n(s)$$

and $$P'_{noise,RB}(s) = \qquad (7)$$
$$1/SNR + \sum_{m \in I_{coll}} \frac{1}{SIR_m} + \sum_{n \in I_{non-coll}} \left\{\rho_{B,0}/\rho_{A,0} \cdot \frac{\rho_{A,n}}{SIR_n} \cdot N_{tx,n}\right\} \cdot S_n(s)$$

$N_{tx,k}$ may denote the number of transmit CRS antenna ports of cell k. SIR (Signal-to-Interference Ratio) and SNR may be given as linear values, where i.

$$S_k(s) = \begin{cases} 1 & \text{if aggressor } k \text{ is scheduled} \\ 0 & \text{if aggressor } k \text{ is not scheduled} \end{cases}.$$

There may be overall $s=\{0, 1, \ldots, 2^{N_{aggressor}}-1\}$ scenarios and the values of $S_k$ for all aggressors may be set according to the binary representation of the number s.

The rhoA value of the serving cell and the rhoA/rhoB values of the interfering cells may be unknown. In this case, median values of the allowed parameter range may be used. The detector may either operate on RB level or on complete subframe level to detect ABS subframes of certain aggressor cells. For operation on a complete subframe, the power values may be averaged over all resource blocks (RB's). The detector may as well be applied at unscheduled RB's of the serving cell. Then the $P_{\rho_A,RB}$ computation may simplify and the serving cell signal energy may not need to be subtracted.

Figure 9:
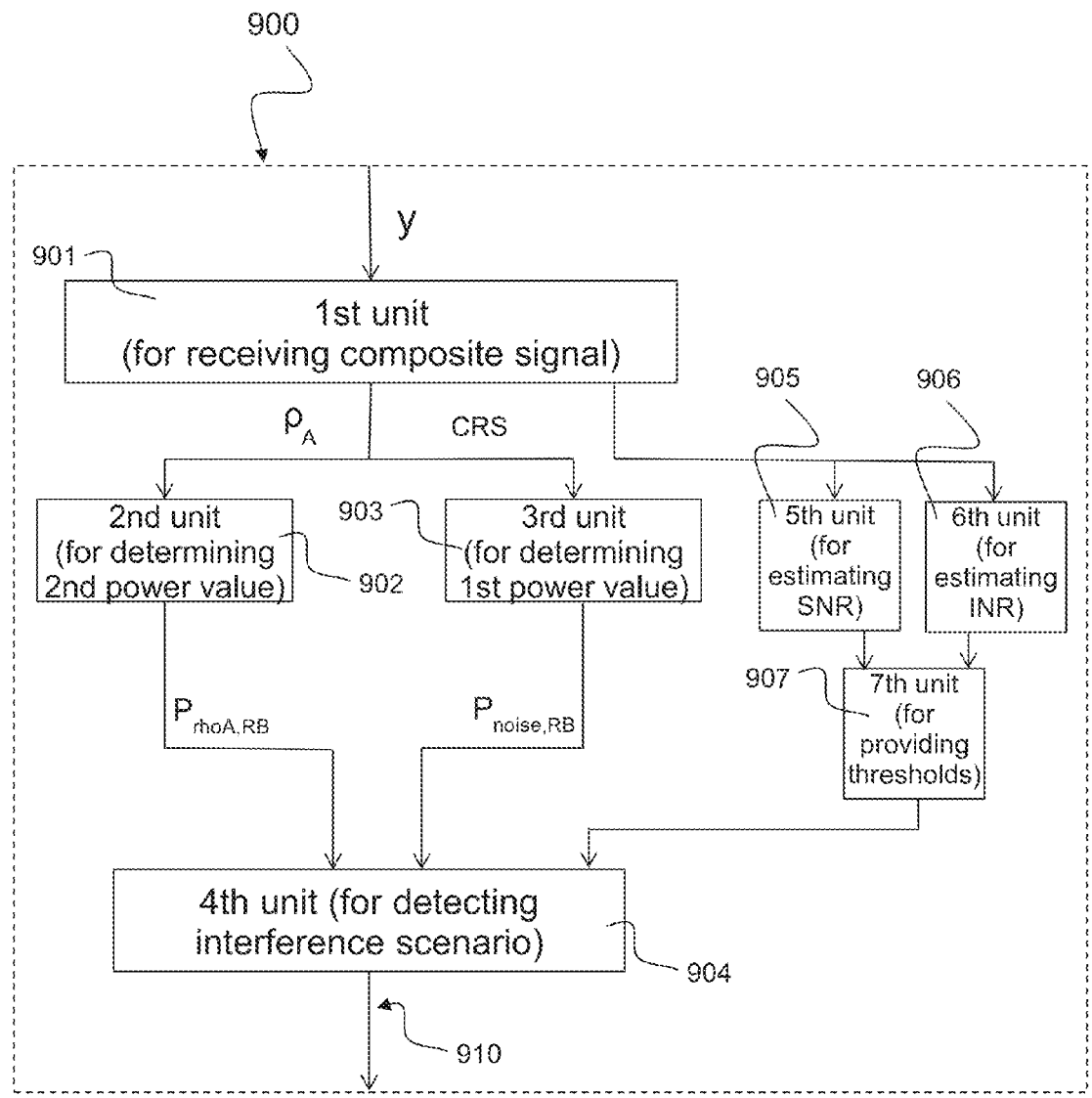
FIG. 9 is a block diagram illustrating an interference detection device 900.

FIG. 9 is a block diagram illustrating an interference detection device 900. The device 900 may include a first unit 901 configured to receive a composite signal comprising transmissions from a serving cell and a plurality of (at least one) interfering cells, each transmission comprising a first part scaled according to a first power scale (rhoA), a second part scaled according to a second power scale (rhoB) and a third part transmitted with a fixed power value. The device 900 may include a second unit 902 configured to determine a first power value $P_{noise,RB}$ based on the third part of the transmission from the serving cell. The device 900 may include a third unit 903 configured to determine a second power value $P_{rhoA,RB}$ based on the first parts of the transmissions. The device 900 may include a fourth unit 904 configured to detect an interference scenario based on the first power value $P_{noise,RB}$ and the second power value $P_{rhoA,RB}$. The first unit 901 may implement the block 701 as described above with respect to FIG. 7, the second unit 902 may implement the block 703 as described above with respect to FIG. 7, the third unit 903 may implement the block 702 as described above with respect to FIG. 7 and the fourth unit 904 may implement the block 704 as described above with respect to FIG. 7. The interference detection device 900 may include an optional fifth unit 905 configured to estimate a signal-to-noise ratio (SNR) of the received composite signal, an optional sixth unit 906 configured to estimate an interference-to-noise ratio (INR) of the received composite signal and an optional seventh unit 907 configured to provide thresholds based on the estimated SNR and INR. The fifth unit 905 may implement the block 801 as described above with respect to FIG. 8, the sixth unit 906 may implement the block 802 as described above with respect to FIG. 8 and the seventh unit 907 may implement the block 803 as described above with respect to FIG. 8. Alternatively, thresholds having been processed from offline measurements may be provided to the fourth unit 904.

In one example, the second unit 902 may determine the first power value $P_{noise,RB}$ based on a power of the composite signal estimated over the third part of the transmission from the serving cell, the third part comprising cell-specific reference signals. In one example, the third unit 903 may determine the second power value $P_{rhoA,RB}$ based on a power of the composite signal estimated over resource elements of the composite signal which resource elements may be scaled according to the first power scale. In one example, the fourth unit 904 may detect the interference scenario based on a two-dimensional threshold with respect to the first power value $P_{noise,RB}$ and the second power value $P_{rhoA,RB}$. In one example, the second unit 902 and the third unit 903 may determine their respective power values $P_{noise,RB}$, $P_{rhoA,RB}$ over a resource block of the composite signal. In one example, the second unit 902 and the third unit 903 may determine their respective power values $P_{noise,RB}$, $P_{rhoA,RB}$ over a subframe of the composite signal.

The interference detection device 900 may implement an interference scenario detection algorithm as described above with respect to FIG. 7, in particular according to equations (4) and (5).

Figure 10:
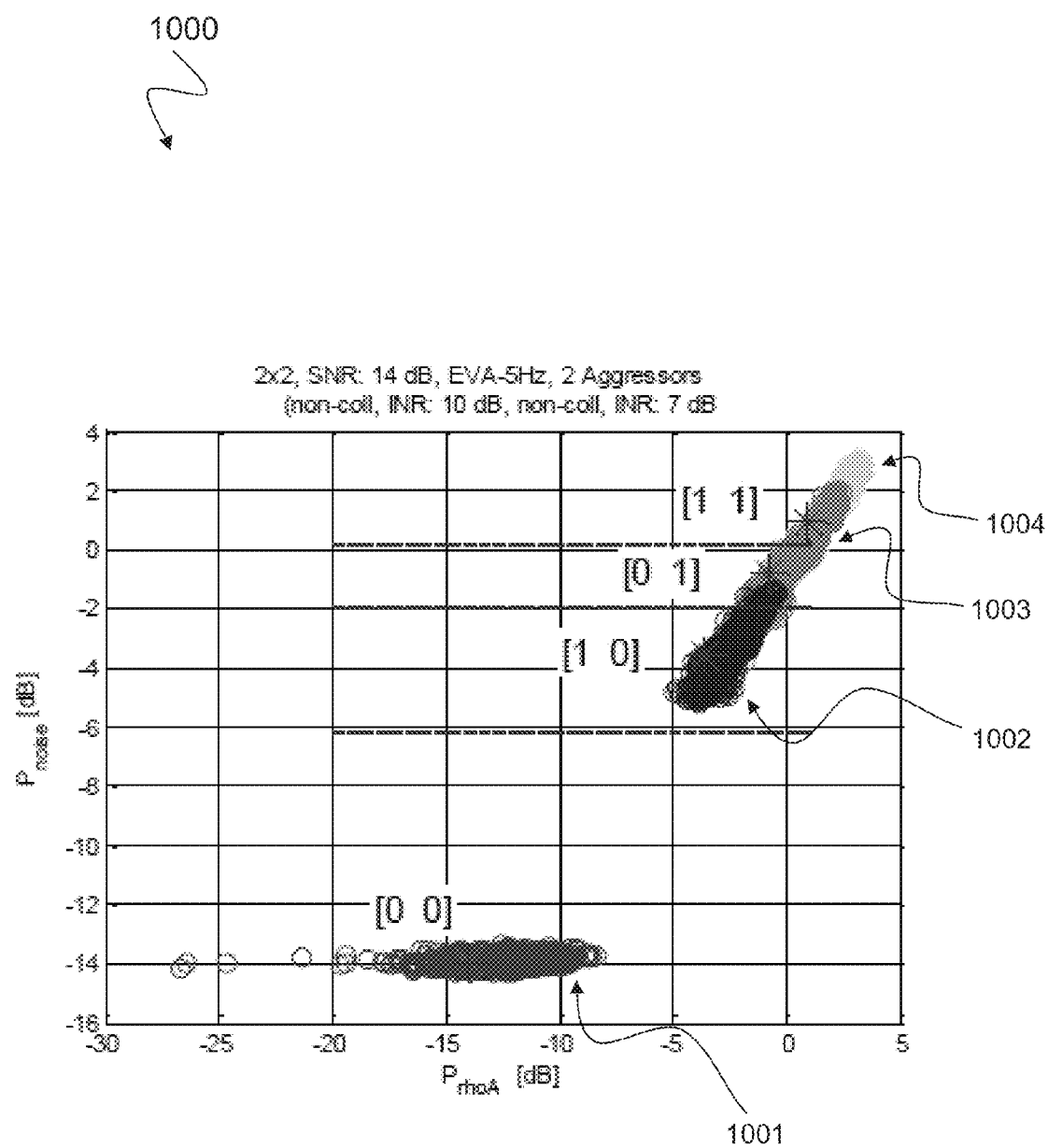
FIG. 10 is a power diagram 1000 illustrating an interference scenario with two non-colliding aggressor cells, i.e. interfering cells.

FIG. 10 is a power diagram 1000 illustrating an interference scenario with two active non-colliding aggressor cells. Both aggressors use 2 CRS antenna ports and the SNR is fixed at 14 dB. One non-colliding aggressor has an INR of 10 dB and the second one has an INR of 7 dB.

The circles denote observed events and the dashed lines denote the detection thresholds. A first event 1001 may be detected for which both aggressors resource blocks are blanked [0 0]. A second event 1002 may be detected for which the first aggressor transmits a resource block and the second aggressor resource block is blanked [1 0]. A third event 1003 may be detected for which the first aggressor resource block is blanked and the second aggressor transmits a resource block [0 1]. A fourth event 1004 may be detected for which both aggressors transmit [1 1] resource blocks.

Figure 11:
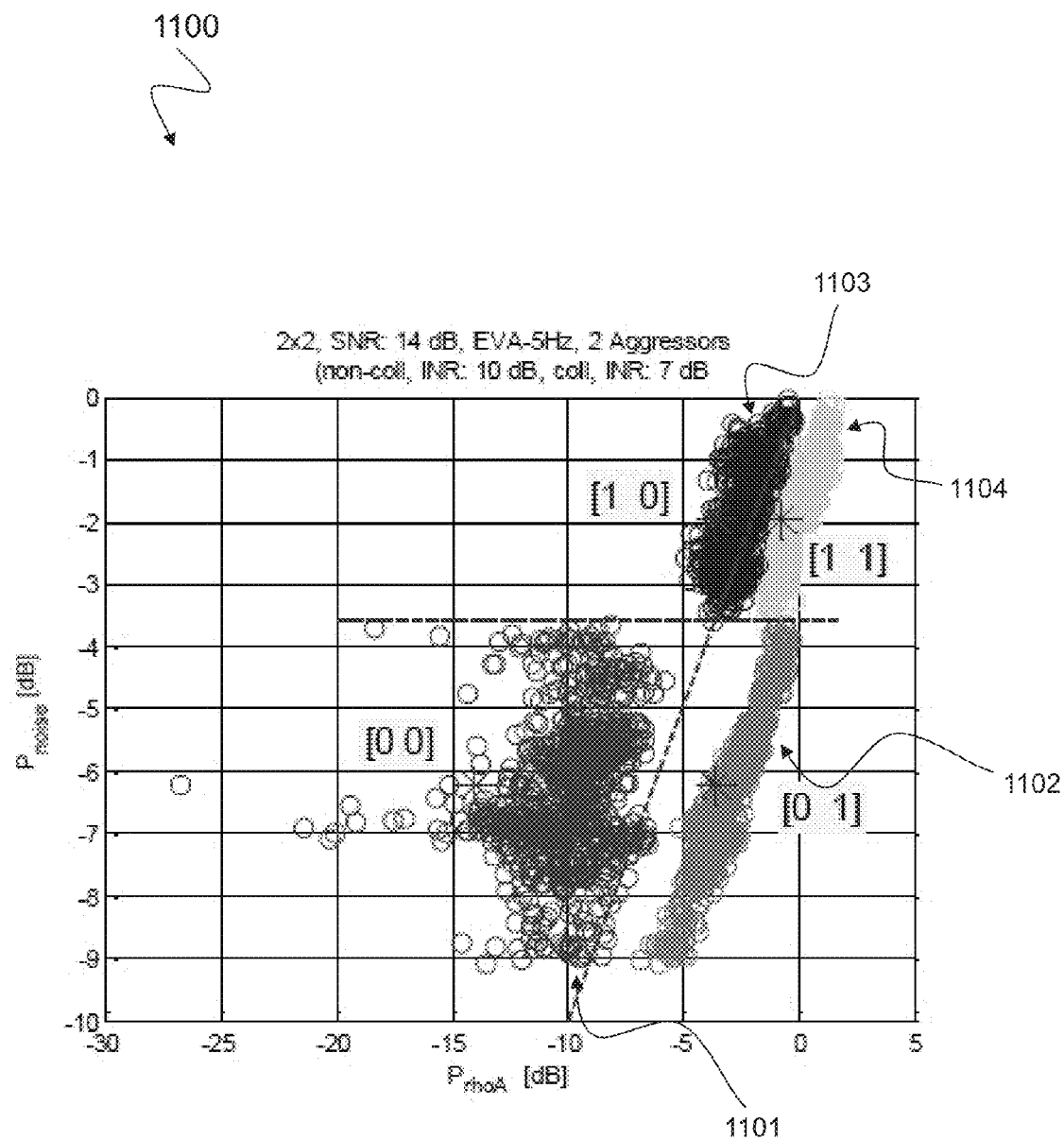
FIG. 11 is a power diagram 1100 illustrating an interference scenario with one non-colliding and one colliding aggressor cell.

FIG. 11 is a power diagram 1100 illustrating an interference scenario with one non-colliding and one colliding aggressor cell.

Both aggressors use 2 CRS antenna ports and the SNR is fixed at 14 dB. One non-colliding aggressor has an INR of 10 dB and one colliding aggressor has an INR of 7 dB.

The circles denote observed events and the dashed lines denote the detection thresholds. A first event 1101 may be detected for which both aggressors resource blocks are blanked [0 0]. A second event 1103 may be detected for which the first aggressor transmits a resource block and the second aggressor resource block is blanked [1 0]. A third event 1102 may be detected for which the first aggressor resource block is blanked and the second aggressor transmits a resource block [0 1]. A fourth event 1104 may be detected for which both aggressors transmit [1 1] resource blocks.

Figure 12:
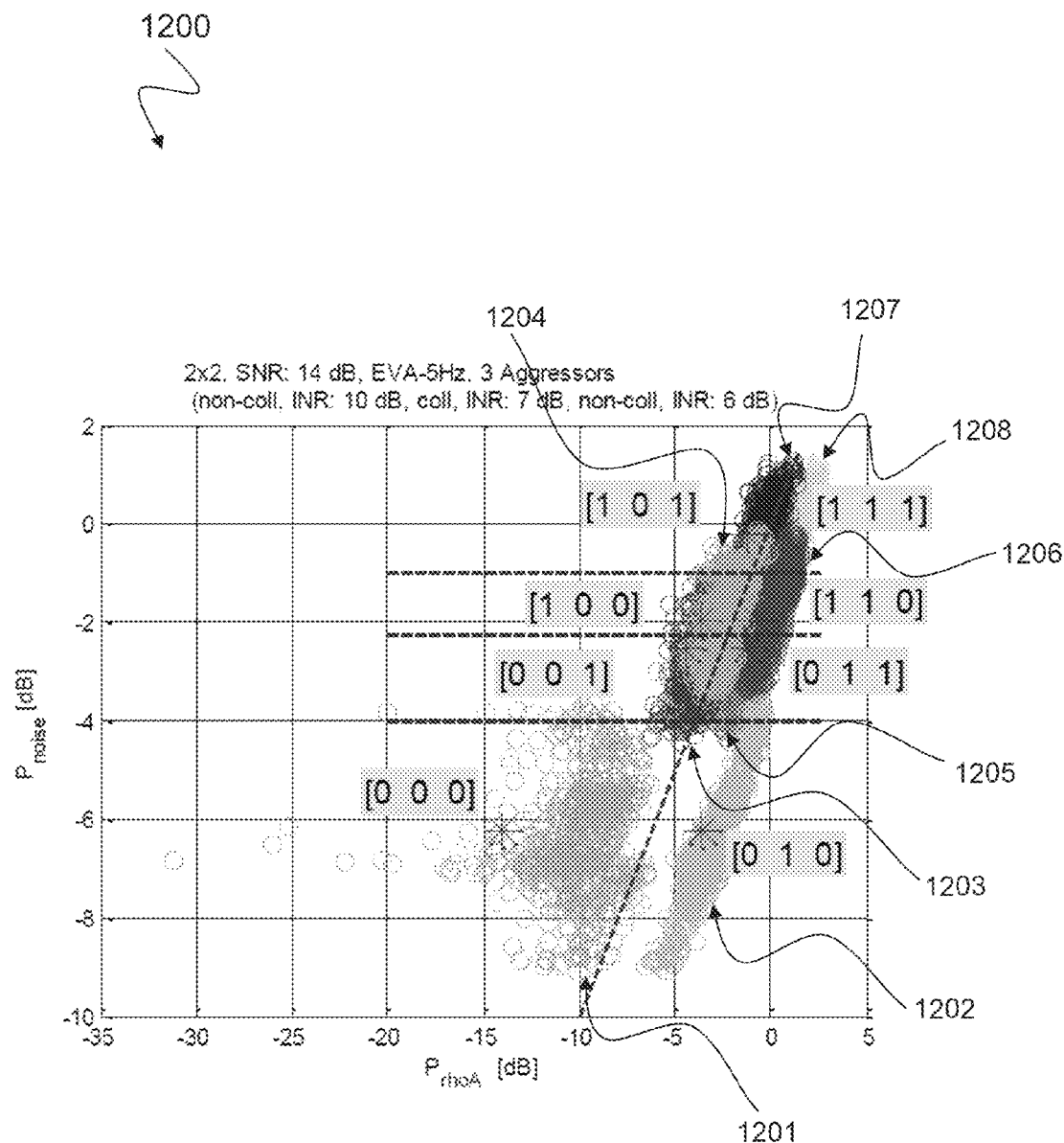
FIG. 12 is a power diagram 1200 illustrating an interference scenario with two non-colliding and one colliding aggressor cell.

FIG. 12 is a power diagram 1200 illustrating an interference scenario with two non-colliding and one colliding aggressor cell. The circles denote observed events and the dashed lines denote the detection thresholds. A first event 1201 may be detected for which all three aggressors resource blocks are blanked [0 0 0]. A second event 1202 may be detected for which the first and third aggressor resource blocks are blanked and the second aggressor resource block is transmitted [0 1 0]. A third event 1203 may be detected for which the first and second aggressor resource blocks are blanked and the third aggressor resource block is transmitted [0 0 1]. A fourth event 1204 may be detected for which the second and third aggressor resource blocks are blanked and the first aggressor resource block is transmitted [1 0 0]. A fifth event 1205 may be detected for which the second and third aggressor resource blocks are transmitted and the first aggressor resource block is blanked [0 1 1]. A sixth event 1206 may be detected for which the first and second aggressor resource blocks are transmitted and the third aggressor resource block is blanked [1 1 0]. A seventh event 1207 may be detected for which the first and third aggressor resource blocks are transmitted and the second aggressor resource block is blanked [1 0 1]. An eighth event 1208 may be detected for which all three aggressors resource blocks are transmitted [1 1 1].

The detection performance may depend on the number of interferer and the relation of the power levels of all involved signals. Certain decisions may be obtained with high probability of detection whereas other decisions may have a higher margin of error.

Figure 13:
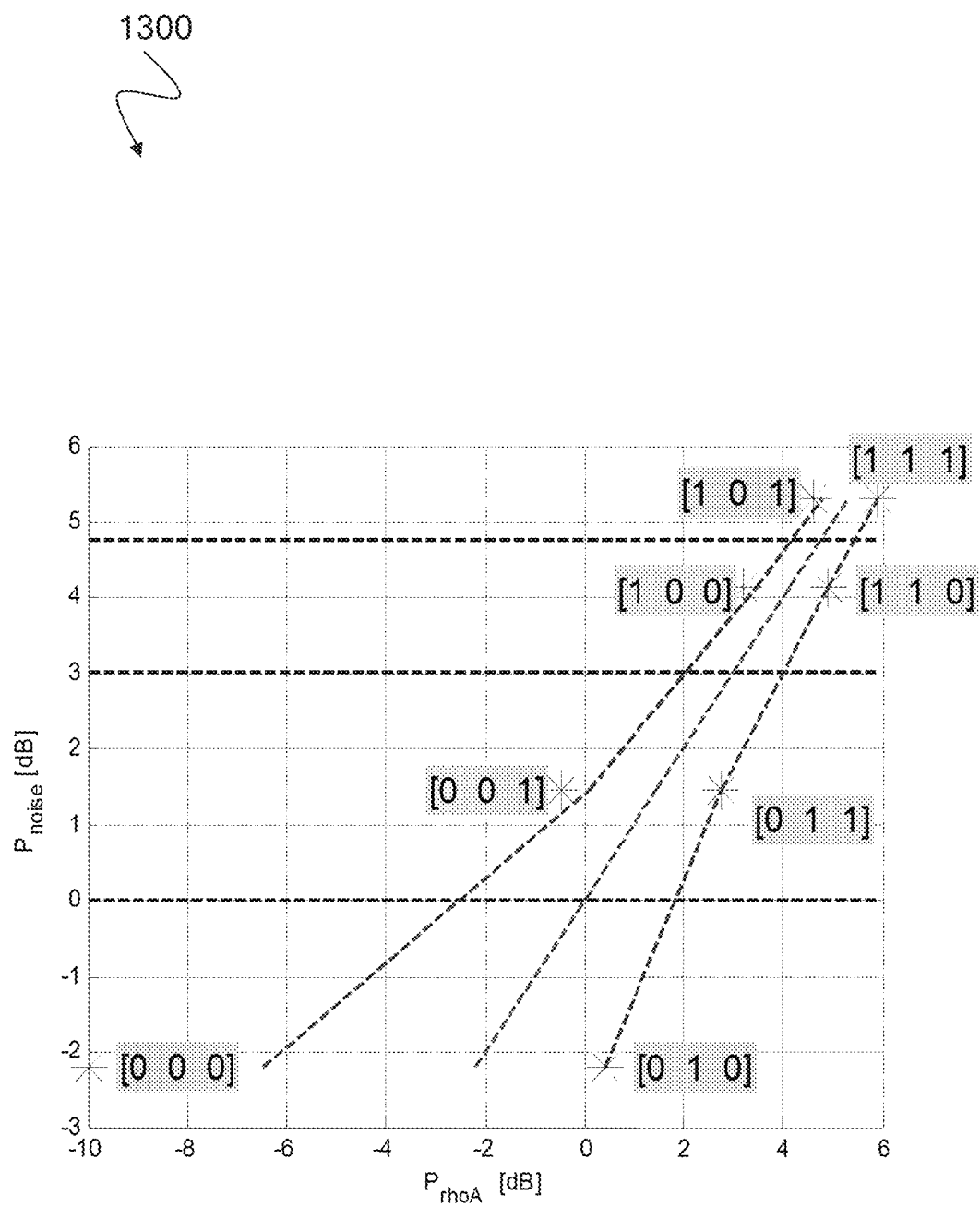
FIG. 13 is a power diagram 1300 illustrating threshold selection for the interference scenario depicted in FIG. 12.

FIG. 13 is a power diagram 1300 illustrating threshold selection for the interference scenario depicted in FIG. 9. The figure shows the influence of different power scaling values PA on the detection thresholds. Here as an example, the PA value of the colliding aggressor is varied between −6 dB and 3 dB.

The thresholds may be used to detect different interference scenarios. In a first scenario [0 0 0] all three aggressors resource blocks are blanked. In a second scenario [0 1 0] the first and third aggressor resource blocks are blanked and the second aggressor resource block is transmitted. In a third scenario [0 0 1] the first and second aggressor resource blocks are blanked and the third aggressor resource block is transmitted. In a fourth scenario [1 0 0] the second and third aggressor resource blocks are blanked and the first aggressor resource block is transmitted. In a fifth scenario [0 1 1] the second and third aggressor resource blocks are transmitted and the first aggressor resource block is blanked. In a sixth scenario [1 1 0] the first and second aggressor resource blocks are transmitted and the third aggressor resource block is blanked. In a seventh scenario [1 0 1] the first and third aggressor resource blocks are transmitted and the second aggressor resource block is blanked. In an eighth scenario [1 1 1] all three aggressors resource blocks are transmitted.

Figure 14:
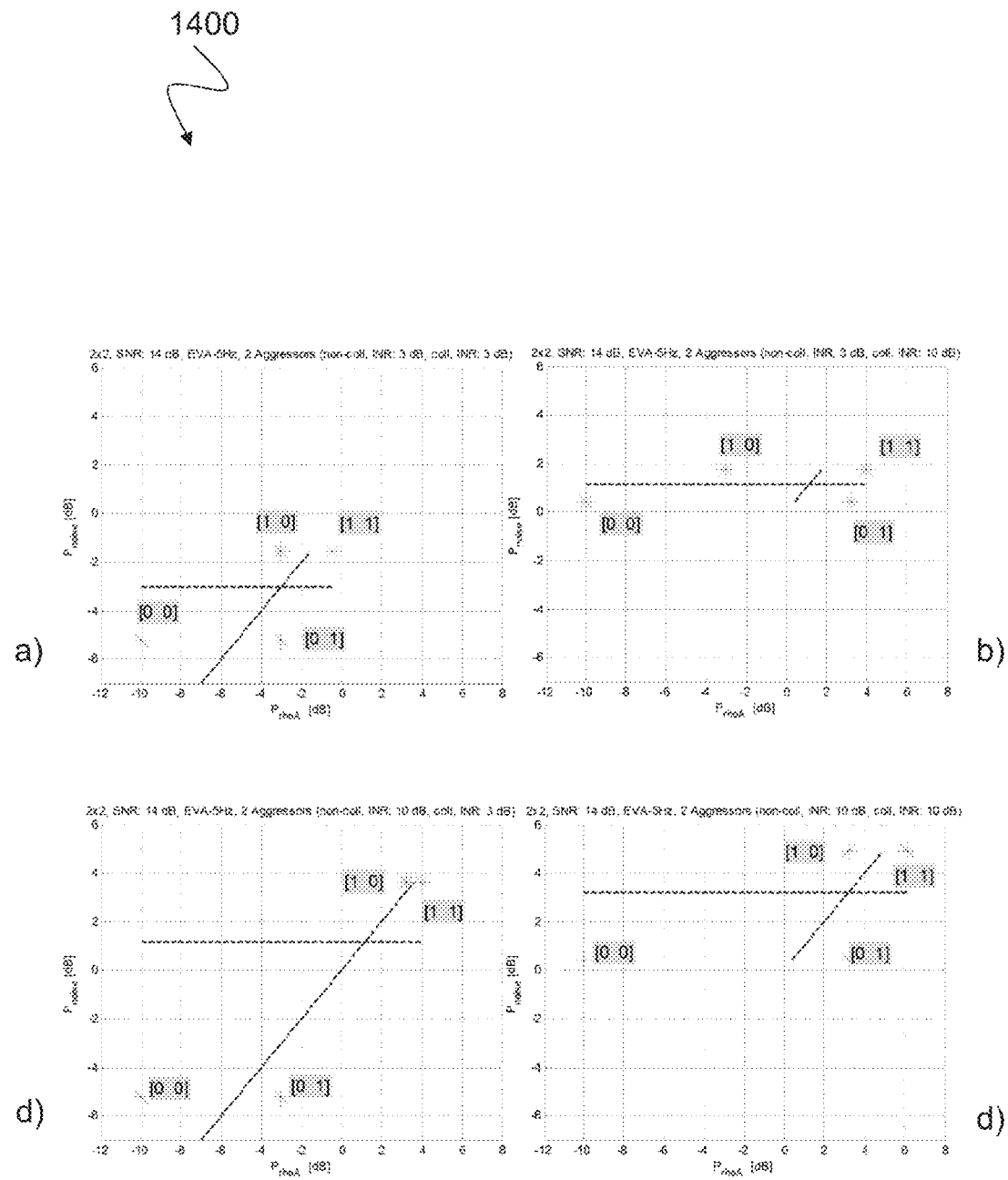
FIG. 14 depicts power diagrams 1400 illustrating threshold selection for a two aggressor scenario.

FIG. 14 depicts power diagrams 1400 illustrating threshold selection for a two aggressor scenario. The figure shows the dependency of expected receive power values and the resulting detection thresholds on the aggressor strength in a two aggressor scenario. The aggressor INRs are varied between 10 dB and 3 dB.

The thresholds may be used to detect different interference scenarios. In a first scenario [0 0] both aggressors resource blocks are blanked. In a second scenario [0 1] the first aggressor resource block is blanked and the second aggressor resource block is transmitted. In a third scenario [1 0] the first aggressor resource block is transmitted and the second aggressor resource block is blanked. In a fourth scenario [1 1] both aggressor resource blocks are transmitted.

The methods and devices as described in this disclosure may be used in the LTE physical layer together with interference mitigation methods as e.g. CRS cancellation, whitening methods. The information provided may be used by subsequent algorithms to improve the receiver performance, i.e. increased data throughput, optimized feedback, improved measurement accuracy, etc.

EXAMPLES

The following examples pertain to further embodiments.

Example 1 is a method for detecting interference scenario, the method comprising: receiving a composite signal comprising a plurality of transmissions from a serving cell and from at least one interfering cell, each of the plurality of transmissions comprising a first part scaled according to a first power scale, a second part scaled according to a second power scale and a third part transmitted with a fixed power value; determining a first power value based on the third part of a transmission from the serving cell; determining a second power value based on the first part of the plurality of transmissions; and detecting an interference scenario based on the first power value and the second power value.

In Example 2, the subject matter of Example 1 can optionally include that the determining the first power value comprises: suppressing a portion due to the transmission from the serving cell in the received composite signal.

In Example 3, the subject matter of Example 2 can optionally include that the suppressing a portion due to the transmission from the serving cell in the received composite signal further comprises: determining the portion due to the transmission from the serving cell by a channel estimate and a reference signal from the serving cell.

In Example 4, the subject matter of any one of Examples 1-3 can optionally include that the determining the second power value comprises: suppressing a portion due to the transmission from the serving cell (203) in the second power value.

In Example 5, the subject matter of Example 4 can optionally include that the suppressing a portion due to the transmission from the serving cell in the second power value comprises: determining the portion due to the transmission from the serving cell based on an averaged channel estimate weighted with the first power scale.

In Example 6, the subject matter of any one of Examples 1-5 can optionally include that each of the plurality of transmissions comprises a plurality of resource elements arranged on a two-dimensional time-frequency grid; and that a predetermined number of the resource elements in frequency and a predetermined number of the resource elements in time forms a resource block.

In Example 7, the subject matter of Example 6 can optionally include that the first power value and the second power value are determined on a resource block basis.

In Example 8, the subject matter of any one of Examples 67 can optionally include that the resource block comprises a control region and a data region; and that a plurality of the first parts, a plurality of the second parts and a plurality of the third parts of the plurality of transmissions are based on resource elements of the data region.

In Example 9, the subject matter of any one of Examples 6-8 can optionally include that each of the plurality of the first parts and the plurality of the second parts of the transmissions comprise rows of resource elements arranged in the resource block with respect to frequency.

In Example 10, the subject matter of any one of Examples 6-9 can optionally include that the plurality of the third parts of the transmissions comprise resource elements comprising cell-specific reference symbols arranged at a plurality of predetermined frequency-time positions in a resource block.

In Example 11, the subject matter of Example 10 can optionally include that the fixed power value of the third parts of the plurality of transmissions is a known reference power value.

In Example 12, the subject matter of Example 11 can optionally include that the plurality of transmissions from at least one interfering cell comprise: a first plurality of transmissions from colliding interfering cells in which cell specific reference symbols collide with cell specific reference symbols of the serving cell; or a second plurality of transmissions from non-colliding interfering cells in which cell specific reference symbols do not collide with cell specific reference symbols of the serving cell; or a combination of the first and second plurality of transmissions.

In Example 13, the subject matter of any one of Examples 1-12 can optionally include that the determining the first power value comprises: averaging a power of the received composite signal over the plurality of the third parts of the transmissions.

In Example 14, the subject matter of any one of Examples 1-13 can optionally include that the determining the second power value comprises: averaging a power of the received composite signal over resource elements of a resource block which resource elements are scaled according to the first power scale.

In Example 15, the subject matter of any one of Examples 1-14 can optionally include that the detecting the interference scenario is based on two-dimensional thresholds with respect to the first power value and the second power value.

Example 16 is a method for providing a plurality of thresholds for interference detection based on a composite signal comprising a transmission from a serving cell and a plurality of transmissions from a plurality of interfering cells, the method comprising: estimating a signal-to-noise ratio of the serving cell at a receiver; estimating for each of the plurality of interference cells an interference-to-noise ratio at the receiver; and providing the plurality of thresholds based on the signal-to-noise ratio of the serving cell, the interference-to-noise ratios of the interfering cells and information indicating an activity state of the plurality of interfering cells.

In Example 17, the subject matter of Example 16 can optionally include that the transmissions from the plurality of interfering cells comprise transmissions from a plurality of interference cells colliding with a reference signal of the serving cell and a plurality of transmissions from a plurality of interference cells not colliding with the reference signal of the serving cell.

In Example 18, the subject matter of any one of Examples 16-17 can optionally include that the transmissions of the composite signal comprise a first part scaled with a first power scaling value and a second part scaled with a second power scaling value; and that the plurality of thresholds are provided based on the first power scaling values and the second power scaling values.

In Example 19, the subject matter of Example 18 can optionally include providing a first power value based on adding expected receive powers due to the first part of the composite signal according to the information indicating an activity state of the plurality of interfering cells; and providing a second power value based on adding expected receive powers due to the second part of the composite signal according to the information indicating an activity state of the plurality of interfering cells; and providing the plurality of thresholds based on the first power value and the second power value.

Example 20 is an interference detection device, comprising: a first unit configured to receive a composite signal comprising a plurality of transmissions from a serving cell and from at least one interfering cell, each transmission comprising a first part scaled according to a first power scale, a second part scaled according to a second power scale and a third part transmitted with a fixed power value; a second unit configured to determine a first power value based on the third part of the transmission from the serving cell; a third unit configured to determine a second power value based on the plurality of the first parts of the plurality of transmissions; and a fourth unit configured to detect an interference scenario based on the first power value and the second power value.

In Example 21, the subject matter of Example 20 can optionally include that the second unit is configured to determine the first power value based on a power of the composite signal estimated over the third part of the transmission from the serving cell, the third part comprising cell-specific reference signals.

In Example 22, the subject matter of any one of Examples 20-21 can optionally include that the third unit is configured to determine the second power value based on a power of the composite signal estimated over resource elements of the composite signal which resource elements are scaled according to the first power scale.

In Example 23, the subject matter of any one of Examples 20-22 can optionally include that the fourth unit is configured to detect the interference scenario based on a two-dimensional threshold with respect to the first power value and the second power value.

In Example 24, the subject matter of any one of Examples 20-23 can optionally include that the second unit and the third unit are configured to determine their respective power values over one of a resource block and a subframe of the composite signal.

Example 25 is a device for interference scenario detection, the device comprising: receiving means for receiving a composite signal comprising transmissions from a plurality of cells, each transmission comprising a first part scaled according to a first power scale, a second part scaled according to a second power scale and a third part transmitted with a fixed power value; first determining means for determining a first power value based on the third parts of the transmissions; second determining means for determining a second power value based on the first parts of the transmissions; and detecting means for detecting an interference scenario based on the first power value and the second power value.

In Example 26, the subject matter of Example 25 can optionally include that the transmissions from a plurality of cells comprise a transmission from a serving cell and transmissions from at least one interfering cell.

In Example 27, the subject matter of any one of Examples 256-26 can optionally include that the first determining means is configured to suppress a portion due to the transmission from the serving cell in the received composite signal.

In Example 28, the subject matter of Example 27 can optionally include that the first determining means is configured to determine the portion due to the transmission from the serving cell by a channel estimate and a reference signal from the serving cell.

Example 29 is a computer readable medium on which computer instructions are stored which when executed by a computer, cause the computer to perform the method of any one of Examples 1 to 19.

Example 30 is a transmission system, comprising a radio receiver comprising an interference detection device according to any one of Examples 20-24; and at least one transmitter configured to transmit a radio signal via a plurality of antenna ports.

In Example 31, the subject matter of Example 30 can optionally include that the radio receiver comprises a plurality of receive antennas configured to receive the composite signal.

Example 32 is a transmission system, comprising a radio receiver comprising an interference detection device according to any one of Examples 20-24; and a plurality of radio cells, each radio cell being configured to transmit a radio signal.

In Example 33, the subject matter of Example 32 can optionally include that each radio cell comprises a plurality of transmit antennas configured to transmit the radio signal of each radio cell; and that the radio receiver comprises a plurality of receive antennas configured to receive the composite signal.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

What is claimed is:

1. A method for interference scenario detection, the method comprising:
    receiving a composite signal comprising transmissions from a serving cell and from at least one interfering cell, each transmission comprising a first part scaled according to a first power scale, a second part scaled according to a second power scale and a third part transmitted with a fixed power value;
    determining a first power value based on the third part of the transmission from the serving cell, wherein the transmission comprises the first part, the second part and the third part;
    determining a second power value based on first parts of the transmissions comprising the first part, the second part and the third part, respectively; and
    detecting an interference scenario based on the first power value, the second power value, and two-dimensional thresholds with respect to the first power value and the second power value, wherein the two-dimensional thresholds based on an estimated signal to noise ratio (SNR) and interference-to-noise ratio (INR).

2. The method of claim 1, wherein the determining the first power value comprises:
    suppressing a portion due to the transmission from the serving cell in the received composite signal.

3. The method of claim 2, wherein the suppressing a portion due to the transmission from the serving cell in the received composite signal comprises:

determining the portion due to the transmission from the serving cell by a channel estimate and a reference signal from the serving cell.

4. The method of claim 1, wherein the determining the second power value comprises:
suppressing a portion due to the transmission from the serving cell in the second power value.

5. The method of claim 4, wherein the suppressing a portion due to the transmission from the serving cell in the second power value comprises:
determining the portion due to the transmission from the serving cell based on an averaged channel estimate weighted with the first power scale.

6. The method of claim 1,
wherein each transmission comprises a plurality of resource elements arranged on a two-dimensional time-frequency grid; and
wherein a predetermined number of the resource elements in frequency and a predetermined number of the resource elements in time forms a resource block.

7. The method of claim 6,
wherein the first power value and the second power value are determined on a resource block basis.

8. The method of claim 6,
wherein the resource block comprises a control region and a data region; and
wherein the first parts, second parts and third parts of the transmissions are based on resource elements of the data region.

9. The method of claim 6,
wherein each of the first parts and second parts of the transmissions comprise rows of resource elements arranged in the resource block with respect to frequency.

10. The method of claim 6,
wherein third parts of the transmissions comprise the resource elements comprising cell-specific reference symbols arranged at predetermined frequency-time positions in ft the resource block.

11. The method of claim 10,
wherein the fixed power value of the third parts of the transmissions is a known reference power value.

12. The method of claim 11, wherein the transmissions from at least one interfering cell comprise:
transmissions from colliding interfering cells which cell specific reference symbols collide with cell specific reference symbols of the serving cell; and/or
transmissions from non-colliding interfering cells which cell specific reference symbols do not collide with cell specific reference symbols of the serving cell.

13. The method of claim 1, wherein the determining the first power value comprises:
averaging a power of the received composite signal over third parts of the transmissions.

14. The method of claim 1, wherein the determining the second power value comprises:
averaging a power of the received composite signal over resource elements of a resource block which resource elements are scaled according to the first power scale.

15. A method of an interference detection device for providing a plurality of thresholds for interference detection based on a composite signal comprising a transmission from a serving cell and transmissions from a plurality of interfering cells, the method comprising:
estimating, at a fifth unit of a receiver of the interference detection device, a signal-to-noise ratio of the serving cell;
estimating for each of the plurality of interference cells, at a sixth unit of the receiver of the interference detection device, an interference-to-noise ratio; and
providing, at a seventh unit of the receiver of the interference detection device, the plurality of thresholds based on the signal-to-noise ratio of the serving cell, interference-to-noise ratios of the interfering cells and information indicating an activity state of the plurality of interfering cells;
wherein the transmissions of the composite signal comprise a first part scaled with a first power scaling value and a second part scaled with a second power scaling value and a third part transmitted with a fixed power value; and
wherein the plurality of thresholds are provided based on the first power scaling values and the second power scaling values;
determining, at a second unit of the receiver of the interference detection device, a first power value based on the third part of the transmission from the serving cell;
determining, at a third unit of the receiver of the interference detection device, a second power value based on first parts of the transmissions; and
detecting an interference scenario, at a fourth unit of the receiver of the interference detection device, based on the first power value, the second power value, and the thresholds with respect to the first power value and the second power value.

16. The method of claim 15,
wherein the transmissions from the plurality of interfering cells comprise transmissions from interference cells colliding with a reference signal of the serving cell and transmissions from interference cells not colliding with the reference signal of the serving cell.

17. The method of claim 15, comprising:
providing a first power value based on adding expected receive powers due to the first part of the composite signal according to the information indicating an activity state of the plurality of interfering cells; and
providing a second power value based on adding expected receive powers due to the second part of the composite signal according to the information indicating an activity state of the plurality of interfering cells; and
providing the plurality of thresholds based on the first power value and the second power value.

18. An interference detection device, comprising:
a first unit configured to receive a composite signal comprising transmissions from a serving cell and from at least one interfering cell, each transmission comprising a first part scaled according to a first power scale, a second part scaled according to a second power scale and a third part transmitted with a fixed power value;
a second unit configured to determine a first power value based on the third part of the transmission comprising the first part, the second part and the third part from the serving cell;
a third unit configured to determine a second power value based on first parts of the transmissions comprising the first part, the second part and the third part; and
a fourth unit configured to detect an interference scenario based on the first power value and the second power value and two-dimensional thresholds with respect to the first power value and the second power value, wherein the two-dimensional thresholds based on an estimated signal to noise ratio (SNR) and interference-to-noise ratio (INR).

19. The interference detection device of claim 18,
wherein the second unit is configured to determine the first power value based on a power of the composite signal estimated over the third parts of the transmissions comprising cell-specific reference signals.

20. The interference detection device of claim 18,
wherein the third unit is configured to determine the second power value based on a power of the composite signal estimated over resource elements of the composite signal which resource elements are scaled according to the first power scale.

21. The interference detection device of claim 18,
wherein the second unit and the third unit are configured to determine their respective power values over one of a resource block and a subframe of the composite signal.

* * * * *